United States Patent [19]

Saneii

[11] Patent Number: 4,746,490
[45] Date of Patent: May 24, 1988

[54] SOLID PHASE PEPTIDE SYNTHESIZER

[76] Inventor: Hossain H. Saneii, 6159 Torrington Rd., Kalamazoo, Mich. 49009

[21] Appl. No.: 827,174

[22] Filed: Feb. 6, 1986

Related U.S. Application Data

[63] Continuation of Ser. No. 534,529, Sep. 22, 1983, abandoned.

[51] Int. Cl.⁴ ............... C07K 1/08; C12M 1/00; G05B 17/00
[52] U.S. Cl. .................... 422/62; 422/81; 422/111; 422/113; 422/116; 422/135; 422/189; 422/228; 422/234; 435/289; 436/55; 436/89; 436/161; 525/54.11; 935/87; 935/88
[58] Field of Search ............. 222/129, 144.5; 260/112.5 R; 422/62, 81, 108, 111, 113, 116, 129, 131, 133, 135, 189, 224, 228, 234; 435/287–289; 436/55, 89, 90, 161; 935/87, 88; 525/54.1, 54.11

[56] References Cited

U.S. PATENT DOCUMENTS

| | | | |
|---|---|---|---|
| 3,531,258 | 9/1970 | Merrifield et al. | 422/116 |
| 3,557,077 | 1/1971 | Brunfeldt et al. | 422/108 |
| 3,645,698 | 2/1972 | Holybee et al. | 222/365 |
| 3,647,390 | 3/1972 | Kubodera et al. | 422/116 |
| 3,725,010 | 4/1973 | Penhast | 422/189 |
| 3,892,531 | 7/1975 | Gilbert | 422/70 |
| 3,951,741 | 11/1976 | Pfaender et al. | 435/69 |
| 4,065,412 | 12/1977 | Dreyer | 422/129 |
| 4,153,416 | 5/1979 | Bonner et al. | 436/90 |
| 4,155,714 | 5/1979 | Bonner et al. | 436/89 |
| 4,216,141 | 8/1980 | Rivier et al. | 260/112.5 R |
| 4,353,889 | 10/1982 | Bender et al. | 435/287 |
| 4,362,699 | 12/1982 | Verlander et al. | 422/131 |
| 4,483,964 | 11/1984 | Urdea et al. | 422/116 |
| 4,517,338 | 5/1985 | Urdea et al. | 422/116 |
| 4,552,922 | 11/1985 | Patchornik et al. | 525/54.1 |
| 4,598,049 | 7/1986 | Zelinka et al. | 422/62 |

OTHER PUBLICATIONS

Derwent Abstracts Numbered: 22142U-BJ;7767-9R-BJ;03421R;70094W/42;67479W/41;61682V/35;53-709T-B;338835-B.

Primary Examiner—David L. Lacey
Attorney, Agent, or Firm—Flynn, Thiel, Boutell & Tanis

[57] ABSTRACT

An apparatus for peptide synthesis in which a plurality of supply valves are arranged in series to define a line for supplying successive reagents to a reaction vessel in which a peptide is to be synthesized. A corresponding plurality of containers contain respective reagents and each, by actuation of its corresponding valve, is connectable through downstream ones of the series of valves to supply its respective reagent to the reaction vessel. For cleaning or reacting with peptide starting material therein further valving permits draining of the reaction vessel to waste and, between applications of successive reagents to the reaction vessel, cleaning of the line of valves by flushing with a cleaning reagent sent from the upstream end of the series of valves through the line to waste. In modified embodiments, the plurality of reagent containers and series line of valves supplies reagents to multiple reaction vessel chambers in such a way that the multiple chamber may simultaneously be occupied by the same reagent in one peptide synthesis step and by several differing reagents, delivered thereto in sequence, in a differing peptide synthesis step, to enable simultaneous production of similar but different peptide analogs.

16 Claims, 12 Drawing Sheets

FIG. I

SOLID PHASE PEPTIDE SYNTHESIZER

This application is a continuation of U.S. Ser. No. 534,529, filed Sept. 22, 1983, and now abandoned.

FIELD OF THE INVENTION

The present invention relates to a method and apparatus for automated synthesis of peptides on insoluble supports.

BACKGROUND OF THE INVENTION

In practice, peptides have been synthesized in quantities ranging from milligrams to less than 10 grams. Existing machines have proven more reliable in the 0.1-1 gram scale. Syntheses can be carried out by stepwise addition of amino acids or by fragment coupling reactions under inert gas or dry atmospheric conditions. Reagents can be transferred by inert gas pressure, by pump or by vacuum. Reagent delivery in the two currently marketed SPPS instruments (namely, Model 990 of Beckman located in California and Model 250 of Vega Biochemical located at Tucson, Ariz.) is accomplished by transferring reagent from a reservoir to a premetering flask(s). The volume of reagent is measured by monitoring with a photocell. From the premetering flask(s) the reagent is then delivered to the reaction vessel by activating a valve. The disadvantage to this system is that the premetering flask must have input conduits from many reagent reservoirs. This common connection can allow contamination of not only the solvent being delivered, but also of the reagent reservoirs themselves by vapors or liquid from other reagent reservoirs. Currently available solid phase peptide synthesizer (hereafter SPPS) machines known to me have up to 12 amino acid reservoirs and up to 11 solvent and other reagent reservoirs are capable of synthesizing only one peptide at a time.

Currently available SPPS machines of which I am aware thus have certain disadvantages which the method and apparatus of the present invention is intended to overcome.

Accordingly, the present invention contemplates an apparatus and method not only capable of performing the functions of currently marketed SPPS models, but which also possess several advantageous improvements as set forth below.

The inventive apparatus and method provide for synthesis of more than one peptide to be carried out under the same condition(s) simultaneously, but with only one set of reagents being required. Two methods are contemplated. In a single path method a multichambered vessel or multicolumns are used. In a multipath method each synthesis is carried out in an individual vessel or column. Simultaneous synthesis of more than one peptide at a time has the following advangages.

(a) Cost saving (labor, initial investment in the number of apparatus, space and other related types of expense).

(b) Time saving.

(c) Assurance that if two similar peptides are synthesized simultaneously the analogs will be essentially identical, except for the intended differences.

The inventive method and apparatus also facilitate synthesis of peptides of higher quality with more rapid coupling and synthesis than those synthesized on prior machines known to me because of the following reasons:

(A) Less chance of cross contamination because of the following:

(a) The manner in which reagents are transferred to the reaction vessel.

(b) Flushing of the lines after each use.

(c) Minimizing the amount of acid or base left behind in the reaction vessel, which reduces the side products and/or racemization.

(d) Preactivation of protected amino acids before addition to peptides on the resin, which reduces contact time and possible side reaction of the peptide with reagents and other additives.

(e) Addition of preactivated amino acids to increase the rate of coupling reaction and decrease the side products.

(B) Rapid transfer of reagents to the reaction vessel(s) or draining from the reaction vessel(s), which is especially advantageous for large scale production because of uniform treatment of the resin in the reaction vessel.

(C) Adaptability to control of temperature and pH, which should also help purity, increase rates of reaction, and otherwise improve the synthesis.

The inventive apparatus and method also are particularly flexible in enabling easily and precisely controllable synthesis of a wide variety of peptides and are adapted for control manually, by hard wired circuitry and by a microprocessor having a master program containing from one to over 200 files. Individual synthetic procedures can be stored in each file. The output from the controller can be connected to a printer for a permanent record of the synthesis in progress. In each file any reagent in any order one wishes can be chosen. This flexibility provides the following advantages.

(a) Number of reagents is not limited.

(b) Order of reagents is not restricted.

(c) Type of solid supports is not limited.

(d) Number of amino acids is not limited.

(e) No limitation on new types of protecting groups, or coupling methods.

(f) Never need to write a program or load a program.

(g) A permanent record of the synthesis is produced.

The objects and purposes of the invention are met by providing a method and apparatus for peptide synthesis in which a plurality of supply valves are arranged in series to define a line for supplying successive reagents to a reaction vessel in which a peptide is to be synthesized. A corresponding plurality of containers contain respective reagents and each, by actuation of its corresponding valve, is connectable through downstream ones of the series of valves to supply its respective reagent to the reaction vessel. For cleaning or reacting with peptide starting material therein further valving permits draining of the reaction vessel to waste and, between applications of successive reagents to the reaction vessel, cleaning of the line of valves by flushing with a cleaning reagent sent from the upstream end of the series of valves through the line to waste. In modified embodiments, the plurality of reagent containers and series line of valves supplies reagents to multiple reaction vessel chambers in such a way that the multiple chambers may simultaneously be occupied by the same reagent in one peptide synthesis step and by several differing reagents, delivered thereto in sequence, in a differing peptide synthesis step, to enable simultaneous production of similar but different peptide analogs.

Other objects and purposes of this invention will be apparent to persons acquainted with apparatus of this general type upon reading the following specification and inspecting the accompanying drawings.

DETAILED DESCRIPTION

Figure 1:
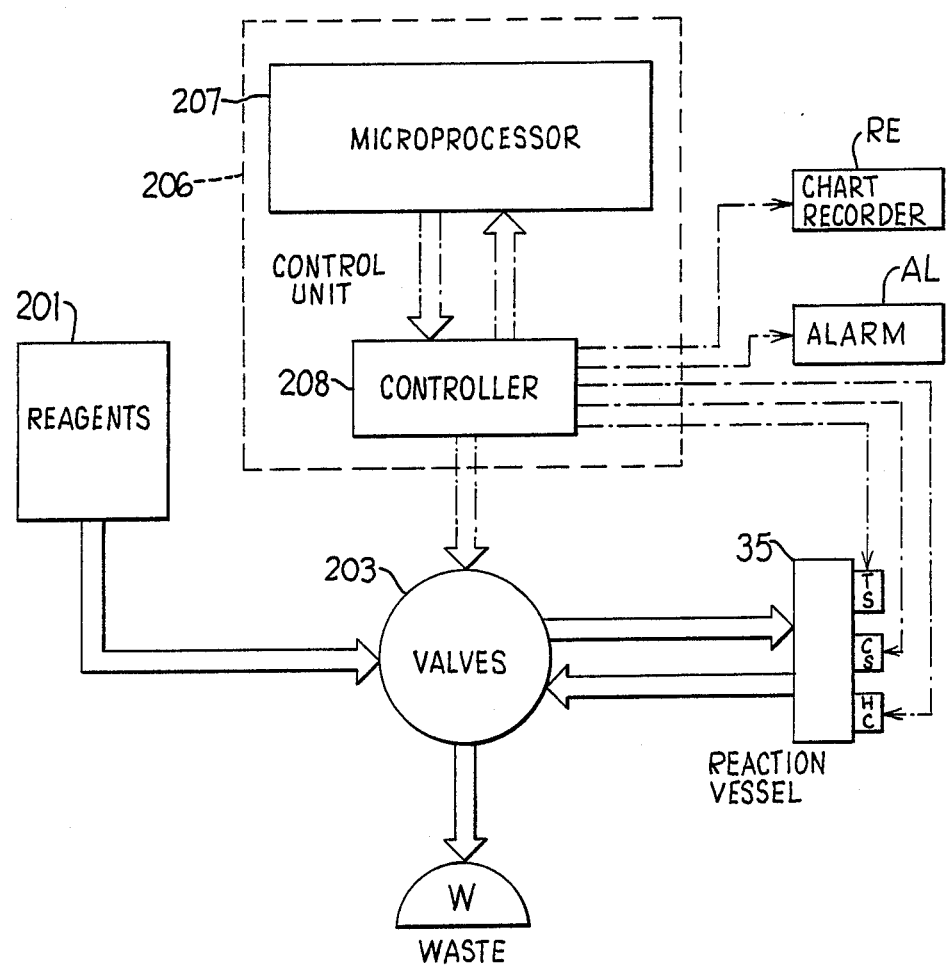
FIG. 1 schematically shows major units of a solid-phase peptide synthesizer embodying the invention.

FIG. 1 shows, in very general form, the interrelation of major units of a solid phase peptide synthesizer in which a plurality of reagents from a reagent unit 201 are supplied in desired sequence by valves of a valve unit 203 to a reaction vessel or vessels 35 in which actual peptide synthesis takes place. Waste products removed from the fluid transfer lines connecting the reagent containers and valves of the units 201 and 203 and the reaction vessel 35 are routed by further valves of the valve unit 203 to a liquid waste unit W. It is primarily by manipulation in appropriate sequence of the valves of the valve unit 203 that synthesis of a desired peptide is accomplished and the valves of such valve unit 203 are controllable by a control unit 206. Control unit 206 may comprise manual actuators for each of the valves in valve unit 203, a hard wired or otherwise fixedly preprogrammed unit for automatically actuating the valves in the unit 203 in desired sequence, or, in the example shown in FIG. 1, a programmable microprocessor 207 acting through a valve controller 208 connected to the valves of the unit 203 to actuate same in desired sequence. The microprocessor 207 and controller 208 may be conventional, it being known to utilize a microprocessor or other control to control valves in a peptide synthesizing apparatus, for example in Verlander et al U.S. Pat. No. 4,362,699.

TOP EMPTYING REACTION VESSEL—FIG. 2

Figure 2:
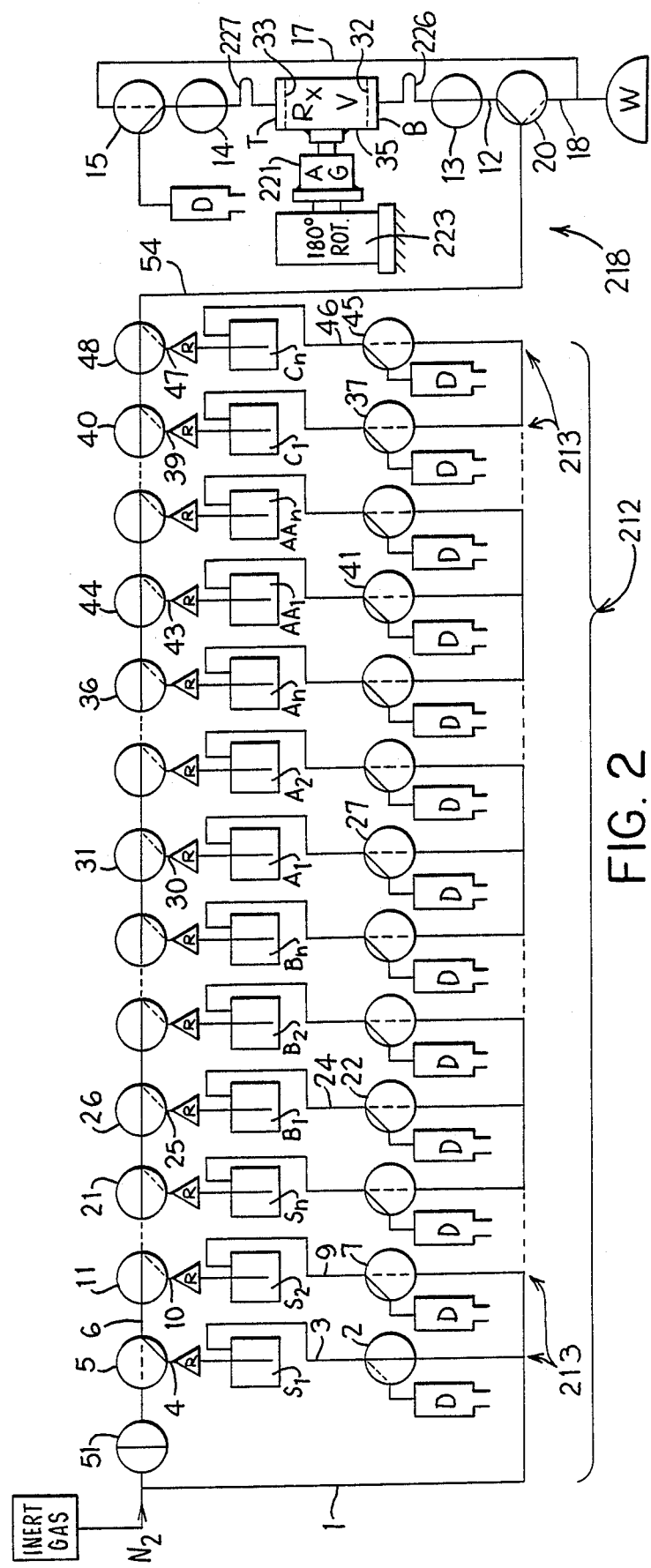
FIG. 2 diagrammatically shows an embodiment of a peptide synthesizer including a top emptying reaction vessel.

FIG. 2 shows a preferred embodiment of a peptide synthesis apparatus according to the present invention. In FIG. 2 are provided a plurality of containers for reagents (as in FIG. 1 reagents unit 201), for example containers $S_1$ through $S_n$ for solvents, containers $B_1$ through $B_n$ for bases, containers $A_1$ through $A_n$ for acids, containers $AA_1$ through $AA_n$ for amino acids (selected ones of which are to be coupled in the reaction vessel 35 to form the desired peptide), and containers Chd 1 through $C_n$ for coupling reagents, such as N,N'-dicyclohexylcarbodiimide (DCC) and 1-hydroxybenzotriazole (HoBt). The reagent containers $S_1$ through $C_n$ are sealed except for connections hereafter described. A pressurized inert gas supply, for example of nitrogen gas, supplies an inert gas pressure line 1. This pressurized inert gas supply, for convenience, carries the reference character $N_2$ in the drawings.

Associated with each of the reagent containers $S_1$ through $C_n$ are a pair of two-position, three-way (three-port) valves having alternate positions respectively shown in solid line and dotted line. For example, a three-way pressurizing and venting valve 2 connects through a gas line 3 (such as a conduit, hose or the like and hereafter referred to merely as a "line") with the upper part of the reagent container $S_1$. The valve 2 in its solid line position connects with the gas pressure line 1 to pressurize container $S_1$ and in its dotted line position connects with a conventional gas drying tower or dryer or dryer tube D for alternately venting the container $S_1$ to the atmosphere without danger of contaminating the reagent in the container with atmospheric moisture.

A further three-way, reagent-gas supply valve 5 connects through a line 4 with the lower portion of the reagent container. The valve 5, in its solid line position, connects the interior of container $S_1$ through the solid line position of a series of similar valves 11, 21, 26 . . . 48 for supplying reagent from container $S_1$ (hereafter simply reagent $S_1$) to reaction vessel 35 and in its dotted line position closes its connection to the container $S_1$ and instead supplies inert gas from source $N_2$ via an opened two-way (two-state, two-port) valve 51 through the series of valves 11, 21, 26 . . . 48 to supply inert gas under pressure to the reaction vessel 35. Interposed in the line 4 between the container $S_1$ and its reagent-gas supply valve 5 is an adjustable flow restricter R.

In a similar manner, the remaining reagent containers $S_2$ through $C_n$ are similarly provided with corresponding pressurizing and venting three-way valves 7, 22, 27 . . . 45, lines 9, 24 . . . 46 leading therefrom to the corresponding reagent container, drying tubes D, reagent-gas supply valves 11, 21 . . . 48 and flow restricters R disposed in lines 10, 25 . . . 47. The flow restricters R may for example be needle valves and each is adjustable to compensate for differences in flow resistance caused by differences in flow path length and number of reagent-gas supply valves 5, 11 . . . 48 encountered by reagents and differences in viscosity of reagents flowing to the reaction vessel 35 from the various reagent containers $S_1 \ldots C_n$. In other words, the flow restricters R each can be adjusted so that the rate of flow into the reaction vessel 35 will be the same regardless of which reaction vessel $S_1 \ldots C_n$ is supplying the reagent liquid. Thus, adjustment of the flow restricters R allows timed delivery of accurate volumes of different viscosities and for reagent containers at different distances from the reaction vessel 35. It has been found that without the flow restricters R, the error in delivery volume is typically only 0–10% and so the restricters R are preferably employed when greater accuracy is required.

The above-described portion of FIG. 2, upstream of the reaction vessel 35, may be referred to as the reagent selection assembly 212 and may be thought of as comprising an array of parallel reagent selectors 213, each comprising a series array of pressuring and venting valve, pressurizing line, reagent container, reagent outflow line, reagent-gas supply valve, and associated dryer tube and restricter, for example as at 2–5, with associated elements D and R. It will be seen that the reagent-gas supply valves 5, 11 . . . 48 of the several reagent selectors 213 are interposed in series in a line 6 leading from the two-way nitrogen gas control valve 51, rightwardly toward line 54 which takes a selected reagent from the reagent selection assembly 212 toward the reaction vessel 35 as hereafter more fully described.

For convenience in reference, Applicant will refer to the direction leftwardly along the line 6 in FIG. 2 as "upstream" and the directin rightwardly along the line 6 in FIG. 2 as "downstream".

The two-position, three-way valves 5 . . . 48 and 2 . . . 45 of the reagent selection assembly 212 may for convenience have their alternate positions defined as an "open" position and a "closed" position. In its "open" position each pressuring and venting valve (for example 2) opens the nitrogen supply line 1 to its corresponding reagent container (for example $S_1$) to pressurize the latter. In its "open" position each reagent-gas supply valve (for example 5) connects the corresponding thus-pressurized reagent container (for example $S_1$) to the line 6, 54 and the reaction vessel 35. In other words, the "open" positions of the valves of a given reagent selector 213 are those in which they supply reagent from their particular reagent container to the reaction vessel 35. Correspondingly, in their "closed" positions, such valves block reagent supply from their particular reagent container to the line 6, 54. In effect then, the reagent-gas supply valves 5, 11 . . . 48, when all in their "closed" positions, continue the line 6 from the nitrogen valve 51 to the assembly output line 54 so that opening of the two-way nitrogen control valve 51 causes nitrogen gas flow along such line 6 and line 54 toward the reaction vessel 35.

Accordingly, depending on the condition of the valves in the reagent selection assembly 212, assembly 212 will provide, on the line 54, a flow of one of the reagents $S_1 \ldots C_n$ or a flow of nitrogen gas under pressure, or the line 54 will be quiescent, substantially at atmospheric pressure.

In the normal or rest condition of the FIG. 2 reagent selection assembly 212 all three-way valves therein are in their "closed" position (reagent-gas supply valves 5 . . . 48 are in their horizontal position and all pressurizing-venting valves 2 . . . 45 are angled to their drying tubes D) and the two-way nitrogen supply valve 51 is off so that no flow is applied to the line 54. Thus, the common line 6 is open from the closed nitrogen control valve 51 to line 54 but neither nitrogen gas nor a reagent is supplied to it. If then the valves 2 and 5 of the reagent selector 213 furthest from the reaction vessel 35 are "opened" (to their FIG. 2 solid line position), nitrogen gas from the line 1 will pressurize the reagent container $S_1$ and reagent liquid therefrom will flow through the valve 5 and line 6 (as completed by the "closed" condition of the several three-way supply valves 11 . . . 48 shown in solid line in FIG. 2) to the line 54 leading to the reaction vessel 35. Alternatively, if the valves of a reagent selector 213 in the middle of the reagent selection assembly 212 are "open", for example if valves 27 and 31 are "opened" to their dotted line position, reagent (acid $A_1$) from the corresponding container $A_1$ will be driven by the nitrogen gas pressure in line 1 only to the right along line 6 to line 54 leading to the reaction vessel 35 and no acid $A_1$ can pass leftwardly along the portion of the line 6 prior to (to the left of) the now dotted line positioned valve 31 and such a leftward flow is blocked by the dotted line position of the valve 31. Thus, cross-contamination is prevented.

The solvents for flushing (washing) the system are placed at the end of the line 6 furthest from the reaction vessel 35, namely the most leftward end thereof, at containers $S_1 \ldots S_n$. Next along line 6 are basic reagent containers $B_1 \ldots B_n$ preceding (being to the left of) acid reagent containers $A_1 \ldots A_n$. Next along line 6 are protected amino acid containers $AA_1 \ldots AA_n$ and closest to the reaction vessel 35, the coupling reagent containers $C_1 \ldots C_n$.

A reaction vessel assembly 218 is supplied by the line 54 of the reagent selection assembly 212 and includes the reaction vessel 35. In the FIG. 2 embodiment, the reaction vessel 35 is a single chambered reaction vessel or single column-type reaction vessel and may itself be of conventional type. The reaction vessel 35 is provided with conventional fluid passing, resin particle blocking filters 32 and 33 at the bottom and top ends thereof in a conventional manner.

The reaction vessel 35 is equipped with means for agitating the contents thereof, which means may take the form of a stirring stick, an internal stirrer powered by an external rotating magnet, a vibrator or any other conventional means. In the particular embodiment shown, the agitator is a conventional rocker agitator 221 for supporting and rocking back and forth through a small arc the reaction vessel 35 (for example an arc of 10° to 30°). Two-way valves 13 and 14 connect to the top T and bottom B of the reaction vessel 35 and are closable to prevent unintended escape of liquid from the reaction vessel 35, particularly during agitation, but are openable to permit loading of a quantity of liquid reagent into the reaction vessel 35 and emptying of the latter.

The outlet end of the line 54 connects to a further two-position, three-way valve 20 which in its solid line position delivers reagent liquid from line 54 through inlet two-way valve 13 to reaction vessel 35. The alternate dotted line position of valve 20 connects line 54 to the waste container W. At the top T of the reaction vessel, a further three-way, two-position valve 15 in its solid line position connects the reaction vessel (through open valve 14) to a further drying tube D. The alternate dotted line position of the valve 15 connects the upper end of the reaction vessel 35 through a line 17 to the waste container W. As to the latter, the particular reaction vessel assembly 218 shown in FIG. 2 is arranged as a bottom loading, top emptying reaction vessel.

To facilitate emptying, the reaction vessel 35 is here provided with a conventional 180° rotation device (inverting device) 223. Here the 180° rotation device supports the agitator 221 which in turn supports the reaction vessel 35. To permit such agitation and 180° rotation, the reaction vessel top and bottom connect to the two-way valves 14 and 13 through flexible tubes 226 and 227. The reaction vessel 35 can thus be loaded with a liquid reagent in its upright position shown in FIG. 2. To empty the reaction vessel, same can then be rotated through 180° so that its top T is lowermost and nitrogen gas under pressure applied through line 54 and valves 20 and 13 to the now upper end B thereof drives residual liquid out through the valve 14 and the alternative dotted line position of the valve 15 into the waste container W.

All the valves in the assemblies 212 and 218 are preferably electrically controlled, for example conventional solenoid controlled valves.

The operation of the FIG. 2 embodiment has been generally indicated above but can be further illustrated by the following example of a procedure for synthesis of a relatively simple generalized peptide.

EXAMPLE 1

Procedure for the synthesis of the generalized peptide (P-$AA_1$-$AA_0$-resin) where P is a protecting group, AA is an amino acid, and resin may be e.g. chloromethylated polystyrene divinylbenzene (Merrifield peptide resin) or benzhydrylamine resin, or any other polymeric resin. The protected $AA_0$-resin starting component is prepared using a standard procedure according to the type of resin and protecting group on $AA_0$. For example, if the protecting group on the N-terminal of the amino acid is a t-Butyloxycarbonyl group (t-Boc), then the following method steps are used:

1. Prewash the line 6, 54. To do this, the valve 2 is opened so nitrogen pressurizes wash solvent container $S_1$ through line 1, 3. Then valve 5 is opened and cleaning solvent $S_1$ travels through the line 4 and then through valves 5 . . . 48 interposed in line 6, 54. With valve 20 shifted to its dotted line, waste position the cleaning solvent $S_1$ sweeps any residue in its path through line 6, 54 to waste W. Then the nitrogen valve 51 is opened and nitrogen transfers the liquid left behind in the line 6, 54 to waste W, to empty the line 6, 54. This step may be repeated for as long and with as many different cleaning reagents (in addition to $S_1$ and not shown) as required to clean the line 6, 54 from valve 5 to line 18 and waste container W.

2. Resin wash. Depending on the resin initially loaded in the reaction vessel 35, the appropriate type of resin washing solvent can be selected, e.g. $S_2$. Venting-emptying valve 15 is normally in its solid line venting position shown. Waste valve 20 is returned to its solid line position shown.

(a) Valve 7 is then opened and nitrogen pressurizes the reagent container $S_2$. The valves 11, 13, 14 are then opened so reagent $S_2$ transfers through line 10 and through valves 11 . . . 48 interposed in line 6, 54 and through valves 20 and 13 to the reaction vessel 35. Then after a time sufficient to admit a desired amount of solvent $S_2$ to vessel 35, valves 7 and 11 are "closed" to shut off flow of solvent $S_2$ to vessel 35.

(b) Nitrogen valve 51 is opened and nitrogen transfers the liquid left behind in the line 6, 54 to reaction vessel 35 the same way as in above subsection (a) except solvent container $S_2$ is vented at D. The pressurized gas performs premixing and line drying functions in that the pressurized gas violently propels the solvent $S_2$ from lines 6, 54 into the reaction vessel 35 to enhance mixing of the solvent $S_2$ with the existing material in reaction vessel 35 and the gas empties the lines 6, 54.

3. Mixing. First, valves 51, 13 and 14 are closed. Then the reagents mixed, as by mechanical arm twist (shaker 221 here shown), or other means not shown such as further injection of inert gas from a separate inlet or stirring.

4. Empty reaction vessel 35. The inverting device 223 is actuated so that vessel 35 inverts 180°. Valves 51, 13 and 14 are opened and the venting valve 15 is opened to waste W. Vessel 35 empties of leftover liquid through line 17 to waste W due to nitrogen pressure through valve 51.

5. Restore reaction vessel 35. Inverting device 223 is reverse actuated and the reaction vessel 35 inverts back to its original upright position. Valves 51, 13, 14, 15 are closed (closed valve 15 venting the top of vessel 35 to the drying tube D).

6. Steps 2, 3, 4 and 5 are repeated several times (e.g. 4 or 5 times).

7. Line wash. Step 1 is repeated.

8. Deprotection. (Removing protecting group, in the present example the t-Boc group, making the NH of amino acid available for coupling to a next amino acid $AA_1$ to be supplied hereafter.) Valve 27 is opened so that nitrogen from line 1 pressurizes corresponding acid container $A_1$. Then valves 31, 13, 14, 15 are opened and acid $A_1$ transfers through lines 30, 6 and 54 to the reaction vessel 35. Then valves 27, 31 are closed. Then step 2b is repeated.

9. Mixing. Step 3 is repeated, usually mixing for 3 to 15 minutes in a first cycle and in second cycle or third cycle mixing for 20 to 30 minutes each time.

10. Empty and restore. Steps 4 and 5 are repeated.

11. Line wash. Step 1 is repeated.

12. Resin wash. Steps 2, 3, 4, 5, and 6 are repeated.

13. Line wash. Step 1 is repeated.

14. Neutralization. Valve 22 is opened and pressurizes the base container $B_1$. Valves 26, 13, 14, 15 are opened so that base liquid $B_1$ transfers to the reaction vessel 35 by way of lines 25, 6, 54. Valves 22, 26 are closed and step 2b is repeated.

15. Base wash. Steps 2, 3, 4, 5 and 6 are repeated. Some amino acids will require an additional step at this time before coupling step 17 hereafter, and for these repeat steps 2, 3, 4, 5, and 6 using an appropriate different solvent, e.g. $S_x$.

16. Line wash. Step 1 is repeated.

17. Coupling. At this step the Boc-$AA_1$ will couple to $AA_0$-resin already in the reaction vessel 35 and form Boc $AA_1$-$AA_0$-resin plus side products such as dicyclohexyl urea. The valve 41 is opened and nitrogen pressurizes the amino acid container $AA_1$ containing Boc-$AA_1$. The valves 44, 13, 14 and 15 are opened. Amino acid solution from container $AA_1$ will transfer through lines 43, 6, 54 to reaction vessel 35. Then valves 44 and 41 are closed and valve 51 is opened to push residual amino acid in the lines 6, 54 into the vessel 35. A second reagent (coupling reagent) $C_1$, for example dicyclohexylcarbodiimide (DCC), is transferred to reaction vessel 35 after valve 37 is opened and nitrogen pressurizes container $C_1$, and valve 40 is then opened to transfer the DCC to the reaction vessel 35 by way of lines 39, 6 and 54 through valves 40, 48, 20 and 13. Then valves 37 and 40 are closed. Then step 2b is repeated.

18. Mixing. Step 3 is repeated. Mixing is continued for 30 minutes to 24 hours depending on the specific amino acid and coupling reagent used.

19. Empty and restore. Steps 4 and 5 are repeated.

20. Resin wash. Steps 2, 3, 4, 5, and 6 are repeated, which removes nonreacted portions of the reagents $AA_1$ and Chd 1.

21. Further resin wash. Steps 2, 3, 4, 5 and 6 are repeated with a different solvent $S_4$ (such as ethyl alcohol) to remove side products, e.g. like dicyclohexyl urea.

22. Resin wash. Step 20 is repeated.

The foregoing method steps result in formation in the reaction vessel 35 of the generalized peptide Boc-$AA_1$-$AA_0$-resin. More complex peptides, and final products, $AA_n \ldots AA_{oo}$ can similarly be formed.

The foregoing method of Example 1 can be used to synthesize a specific peptide, a simple but representative example being the following.

EXAMPLE 2

Procedure for the synthesis of the specific peptide Boc-Phe-Gly-Resin wherein the final product is Phe-Gly, namely phenylalanylglycine, wherein Phe represents phenylalanine, and Gly represents glycine.

As a preliminary step,

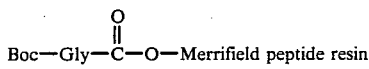

Boc—Gly—C—O—Merrifield peptide resin (polystyrene divinylbenzene resin) is prepared by the well known standard method.

Then the FIG. 2 apparatus is sequenced through the steps of Example 1 with the following specifics or modifications.

I. The Boc-Gly-Resin starting material is placed in reaction vessel 35 in a conventional manner.

II. Resin wash. Step 2 is carried out with $S_1$ and $S_1$ is $CH_2Cl_2$ (methylene chloride).

III. Mixing, empty and restore. Steps 3, 4 and 5 are carried out with mixing step 3 timed at 1 minute each time.

IV. Repeating. Step 6 is carried out 4 or 5 times.

V. Deprotection. Step 8 is carried out wherein $A_1$ is 40% trifluro-acetic acid in $CH_2Cl_2$. A first mixing cycle lasts 5 minutes and a second cycle lasts 30 minutes.

VI. Line washing. Step 11, like Step 1, uses $CH_2Cl_2$.

VII Resin wash. Step 12 uses $CH_2Cl_2$ for 1 minute each time for 5 times.

VIII. Neutralization. Step 14 is carried out for 2 minutes 2 times.

IX. Base wash. Step 15 washes the base from the resin using $CH_2Cl_2$ for 1 minute each time for 3 times.

X. Further resin wash step to wash the resin to remove $CH_2Cl_2$, using dimethylformanide (DMF). (This repeats step 2 except using reagent container of DMF—see note at end of step 15.)

XI Coupling. Step 17 is carried out except $AA_1$ is Boc-Phe and the coupling reagent is $C_2$, namely 1-Hydroxybenzotriazole (and hereafter HoBt). The valve 45 is opened and nitrogen pressurizes the $C_2$ (HoBt) container. Then valves 48, 13, 14, 15 are opened and the HoBt transfers to reaction vessel 35 by way of lines 6, 54 through valves 48, 20 and 13. Then, valves 45 and 48 are closed. Then step 17 is repeated using DCC. The time for coupling may be 15 minutes–2 hours.

XII. Resin wash. Step 20 is carried out using as the solvent $CH_2Cl_2$ for 1 minute each time for 3 times.

XIII. Further resin wash (washing the side product). Step 21 is carried out using ethyl alcohol.

At this point, if the reaction is completed (for example as indicated in testing conventionally the contents of reaction vessel 35), then the preparation of the Boc-Phe-Gly-Resin has been completed. If, on the other hand, the reaction is found not complete or if one wants further assurance of completion, a double coupling sequence can now be performed. Thus, double coupling is normally carried out if the reaction is not completed or as a safety precaution, e.g. if the reaction was carried out overnight or under other unsupervised conditions. At this point, for double coupling the latter above-listed steps of Example 2 will be repeated from step VI of preparation of Boc-Phe-Gly-Resin to step XIII.

In the general and specific Examples 1 and 2 immediately preceding, it will be noted that the lines 6, 54 may be emptied (by flushing with pressurized inert gas) after flowing each solvent or other reagent to the reaction vessel 35. Also, before adding the next reagent to the reaction vessel 35, the lines 6, 54 may be flushed with an appropriate solvent $S_1$, $S_2$, etc., located at or adjacent the leftward (remote from reaction vessel 35) end of lines 6, 54, which line flush liquid is then directed to waste container W, to eliminate from the line 6, 54 any residual reagent (e.g. base, acid, amino acid, coupling reagent, etc.) left behind in the line 6, 54.

BOTTOM EMPTYING REACTION VESSEL—FIG. 2A

Figure 2A:
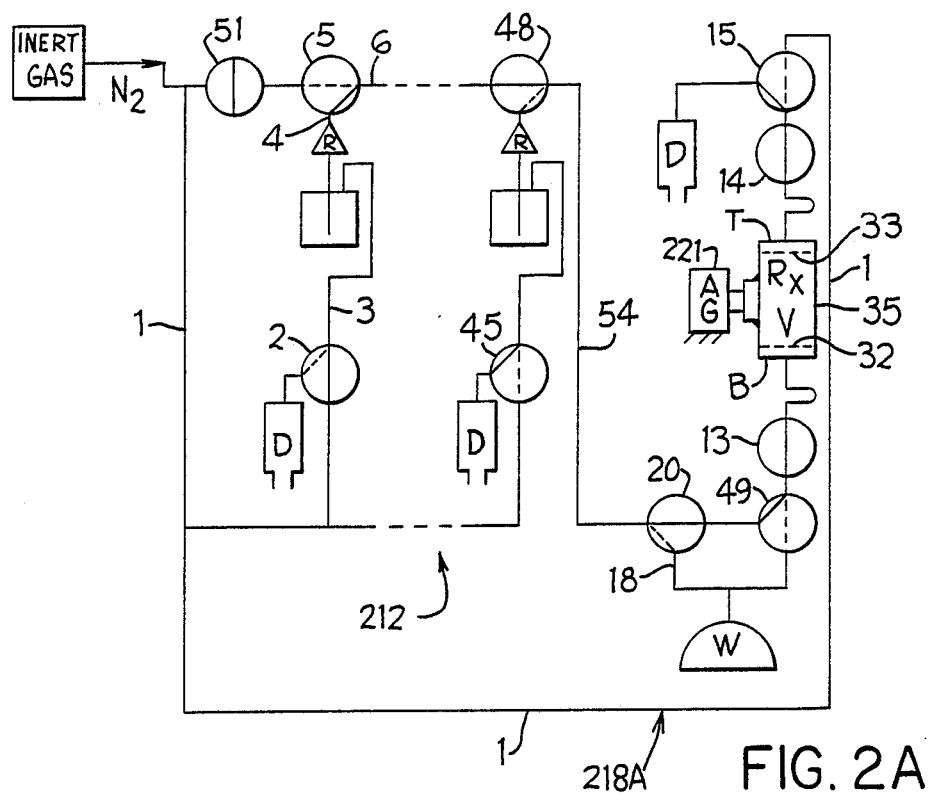
FIG. 2A shows an apparatus similar to that of FIG. 2 but modified to provide a bottom emptying reaction vessel.
Figure 2B:
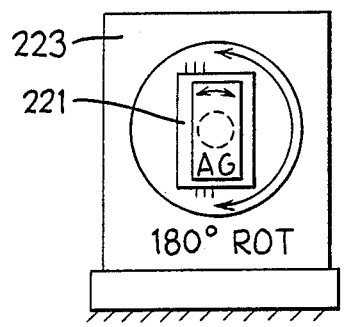
FIG. 2B is an elevational view of the agitator and 180° rotation device of FIG. 2 detached from the reaction vessel and looking toward the left in FIG. 2.

FIG. 2A discloses an embodiment modified to empty the reaction vessel 35 from the bottom B thereof, rather than from the top T as in above-described FIG. 2. The FIG. 2A embodiment is similar to the FIG. 2 embodiment except in having a reaction vessel assembly 218A modified as follows.

The line 17 of FIG. 2 connecting the upper (normally closed) port of reaction vessel venting valve 15 to waste W is eliminated and instead such normally closed port is connected to a branch of the pressurized nitrogen line 1. A further three-way waste valve 49 is added and has a solid line, normally open path interposed between the valves 20 and 13 and a broken line, normally closed path interposed between the valve 13 and waste W. The 180° rotation device 223 is unnecessary since the reaction vessel 35 is arranged in FIG. 2A to empty the waste through its bottom end.

Operation in FIG. 2A is like that above described with respect to FIG. 2 except that fluid (gas and liquid) from line 6, 54 passes additionally through the valve 49 to enter the bottom of reaction vessel 35. Also, to empty excess reagent liquid from the reaction vessel 35, the valves 15 and 49 are shifted to their dotted line positions so that pressurized inert gas from line 1 passes downwardly therethrough and through open valve 14, reaction vessel 35, open valve 13 and through the second waste valve 49 so as to drive residual liquid from the reaction vessel 35 through valves 13 and 49 into waste receptacle W. The latter takes place with the first waste valve 20 in its solid line position shown. Therefore, waste fluid from the reaction vessel 35 cannot pass through first waste valve 20 to contaminate reagent supply line 6, 54.

POROUS MULTI-CHAMBER VESSEL—FIG. 3

Figure 3:
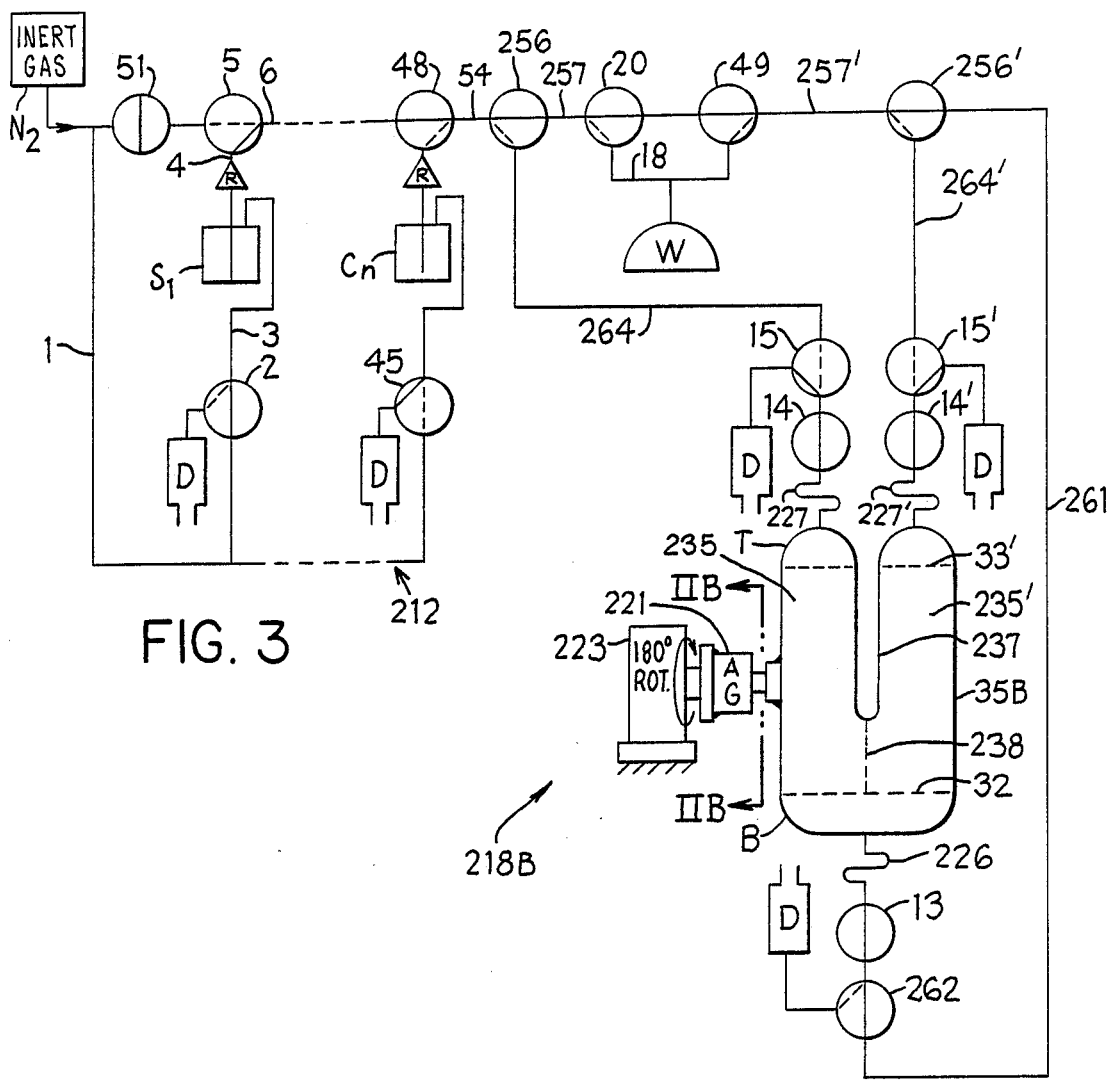
FIG. 3 diagrammatically shows an embodiment similar to that of FIG. 2 but modified to have a porous wall multi-chamber vessel.
Figure 3A:
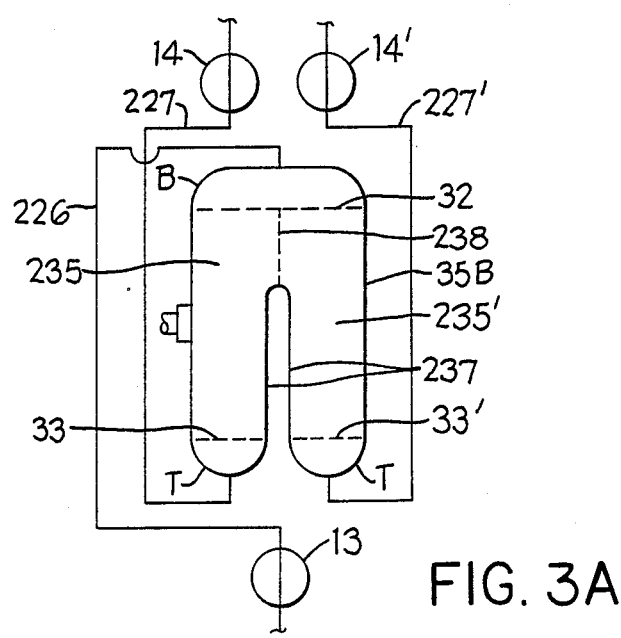
FIG. 3A shows an alternate position of the reaction vessel of FIG. 3.
Figure 4:
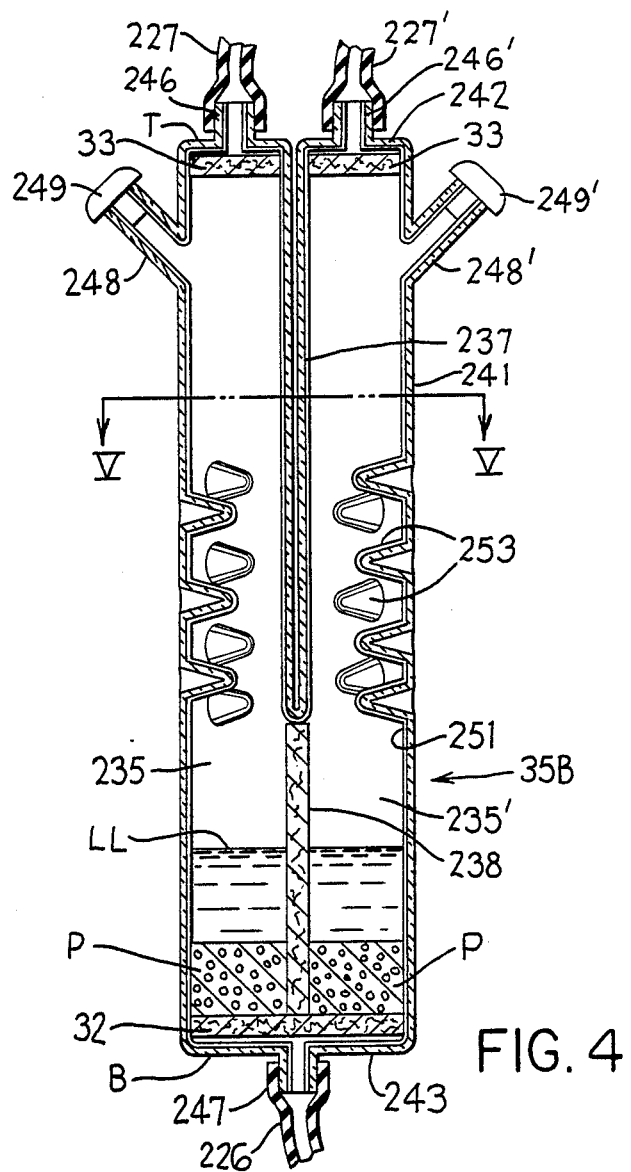
FIG. 4 shows a central cross-sectional view in more detail of the FIG. 3 reaction vessel.
Figure 5:
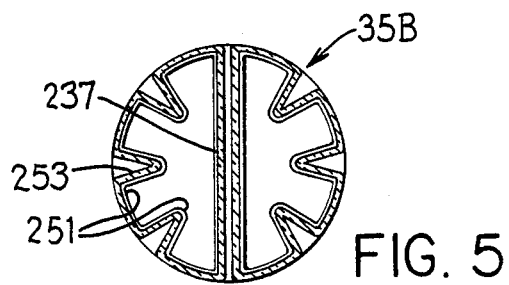
FIG. 5 is a cross-sectional view substantially taken on the line V—V of FIG. 4.

FIGS. 3 and 3A show a further modified embodiment incorporating a modified reaction vessel assembly 218B, to which is connected the reagent selection assembly 212 of FIG. 2. The modified reaction vessel assembly 218B includes a modified reaction vessel 35B shown in more detail in FIGS. 4 and 5. The modified reaction vessel 35B is a multi-chamber reaction vessel. For illustration, a two-chamber vessel 35B is shown, but the reaction vessel may include more than two chambers, such chambers preferably being identical. More particularly, the vessel 35B is here divided into two parallel upstanding chambers 235 and 235' by a two-part divider 237, 238. The top portion 237 of the divider is nonporous and, with the peripheral wall 241 and top and bottom end walls 242 and 243 is preferably of substantially transparent glass to maximize visibility of contents during use and minimize interreaction of reagents with the material of the reaction vessel 35B. The top part 237 of the divider (preferably about two-thirds the length of the divider) is nonporous and may be of single or (as here shown) double-wall construction. The bottom part 238 of the divider is constructed of a porous material (e.g. glass frit) which allows gas and liquid to pass freely therethrough, but blocks passage of particles (in this embodiment, particles larger than, for example, 0.060 mm), to maintain separated in the chambers 235 and 235' the resin particles P above described, on which respective peptides are to be formed. When the reaction vessel 35B is inverted (top T down and bottom B up as in FIG. 3A) the nonporous part 237 of the divider prevents flow of both particles and fluids between the two chambers 235 and 235'.

At the top T of each chamber 235 and 235' is a corresponding fluid inlet-outlet fitting 246 and 246' for fluid entry and exit with respect to the chamber and which is conventionally provided with a resin particle blocking, glass frit filter 33 and 33'. The bottoms B of the two chambers 235 and 235' communicate through a common fluid inlet-outlet fitting 247 with tube 226 and a further conventional glass frit filter 32 blocks exit of resin particles P through the fitting 247.

For initial loading of resin particles carrying an initial amino acid $AA_0$ into the chambers 235 and 235', and for subsequent removal from such chambers of the peptide synthesized on such resin particles, particle inlet-outlet fittings 248 and 248' communicate through the peripheral wall 241 with such chambers 235 and 235' and are normally closed by removable plugs 249 and 249'. The interior surfaces of the reaction vessel are preferably silicone coated, as generally indicated at 251 to prevent the resin particles P from adhering to the reaction vessel walls.

Anti-splash fingers 253 protrude into the chambers 235 and 235' at the center portion of the reaction vessel 35B and are spaced from the ends thereof. The fingers 253 are arranged to prevent, when the reaction vessel 35B is agitated in its inverted FIG. 3A position, splashing of reagent liquid therepast and above the nonporous part of the divider 237 so as to avoid contamination of the reagent liquids (which may be two different reagents) in the inverted (hence divided) chambers 235 and 235' of FIG. 3A. The reagent liquid level is normally well below the level of the anti-splash fingers 253, for example as shown as LL in FIG. 4. The fingers 253 are configured and spaced so as not to interfere with dropping of the resin particles from one end of the chambers 235 and 235' to the other upon 180° inversion of the vessel 35B from its FIG. 3 position to its FIG. 3A position, or vice versa. This assures that the resin particles always drop by gravity to the lower end of the vessel 35B.

In FIG. 3, the path of reagent liquid or pressurized gas on line 6, 54 from reagent selection assembly 212 to the bottom B of the vessel 35B, is through a series path comprising a three-way valve 256, line 257, above-described three-way waste valves 20 and 49, a line 257', a further three-way valve 256', a line 261, a further three-way venting valve (equipped with a drying tube D), and the above-described two-way valve 13 and flexible conduit 226. This path can be used to apply both reagent and a premixing quantity of pressurized gas from the line 54 to the bottom B of reaction vessel 35B in the manner above described with respect to reaction vessel 35 of FIG. 2. The venting path from the top T of chamber 235 through flexible conduit 227, two-way valve 14 and venting valve 15 to dryer D (as above described with respect to FIG. 2) is duplicated at the top of chamber 235' at 227', 14' and 15'.

To drain the vessel 35B in its upright FIG. 3 position, valves 256, 15 and 49 are shifted to their dotted line positions, valves 14 and 13 are open as shown (valve 14' being closed) and the reagent selection assembly 212 is actuated in the manner above described with respect to FIG. 2 to pressurize the line 54 with nitrogen gas, which then passes through valve 256, line 264, and valves 15 and 14 into the top of vessel 35B to drive leftover liquid reagent from the bottom B of the vessel down through valves 13 and 262, through line 261 and valves 256' and 49 to waste W. Valve 14' in its closed position blocks escape of the incoming gas through its dryer D. In this manner, the vessel 35B can have both its chambers 235 and 235' filled with the same reagent and then emptied. The FIG. 3 apparatus with the reaction vessel 35B in its upright position shown permits all of the method steps, above described with respect to FIG. 2, to be carried out therein.

In addition, the modified reaction vessel assembly 218B of FIG. 3 permits substantially simultaneous synthesis of two similar but different peptides (peptide analogs), for example peptide analogs which are identical peptides except for having differing amino acids at one or more locations in the chain of amino acids defining the peptides. The portions of the amino acid chain which are the same in the two analogs are synthesized in the FIG. 3 position of the vessel 35B. However, the vessel 35B is invertable through 180° to its FIG. 3A position to permit application of different amino acids (for example $AA_j$ and $AA_k$) on the resin particles P in the respective chambers 235 and 235'.

To this end, such inversion of vessel 35B to its FIG. 3A position drops the resin particles P onto the filters 33 and 33' at the now depending tops T of the chambers. Then, reagent selection assembly 212 can be actuated as above described to apply a desired reagent (for example $AA_j$) above described through line 54, the FIG. 3 dotted line position of valves 256 and 15, valve 14 (FIG. 3A), flexible conduit 227, and into the now depending top T of leftward reaction chamber 235. The line 6, 54 is then preferably cleaned (e.g. as in Example 1, Step 1 above) by flushing through valve 20 to waste W with a suitable solvent, for example solvent $S_1$ to waste. Optionally, line 6, 54 may be blown dry with pressurized gas $N_2$ through the same path. Then, a differing reagent (for example $AA_k$) may be supplied from reagent selection assembly 212 through line 54, the solid line position of valves 256, 20 and 49, the dotted line position of valve 256', line 264', valve 15' in its dotted line position, valve 14', flexible conduit 227' and thence into the now downwardly facing top T of the rightward chamber 235'. In this way, two entirely different reagents can be added nearly simultaneously (one after the other) in the same process step, and hence in the same amino acid location in the peptide chain to simultaneously form similar but nonidentical peptides.

To expel leftover reagent from the chambers 235 and 235', the FIG. 3A positioned reaction vessel 35B can be restored, by 180° rotation of device 223, to its FIG. 3 upright position, dropping all of the carrier resin particles P onto the filter 32 at the now depending bottom B of the reaction vessel. Inert gas $N_2$ can then be supplied by reagent selection assembly 212 through line 54, dotted line position of valves 256 and 15 (valve 15' being in its dotted line position and valve 256' in its solid line position to seal the top end T of chamber 235'), valve 14 and flexible line 227 to pressurize the vessel 35B. This drives the excess reagent liquid downward out of the bottom B of the vessel 35B through line 226, valves 13 and 262, line 261, solid line positioned valve 256' and dotted line positioned valve 249 to waste W.

Thus, for most of the synthesis of a pair of peptide analogs, the vessel 35B remains in its FIG. 3 position, being inverted to its FIG. 3A position only for processing by different reagents in the two chambers 235 and 235'. Thus, most of the steps required to prepare two differing peptide analogs will be carried out precisely simultaneously in the FIG. 3 position of the two chambers 235 and 235', the remaining steps being carried out one after the other for the two chambers in the inverted FIG. 3A position. Thus, instead of two peptide analogs requiring twice the number of days to prepare with one reagent selection assembly 212, two peptide analogs are prepared in very little more time than one peptide analog, using Applicant's FIG. 3, 3A and 4 apparatus.

As above discussed with respect to line 12 in FIG. 2, it is preferred that the lines 227, 264 and 257 from the top of chamber 235 to waste 20 be as short as possible and this applies also to the lines 227', 264' and 257', as well as to the other through lines 226, 261 and 257'. Since, in the embodiment shown, these lines are not subject to line washing (as in Step 1 of Example 1 above) or blowing dry to clear same of all reagent from a prior method step, maintaining these lines short minimizes the amount of potential contaminating material therein. The line 6, 54 is considerably longer and therefore is washed and, if desired, blown dry by gas to minimize cross-contamination between successively used reagents.

SOLID WALL MULTI-CHAMBER VESSEL—FIG. 9

Figure 9:
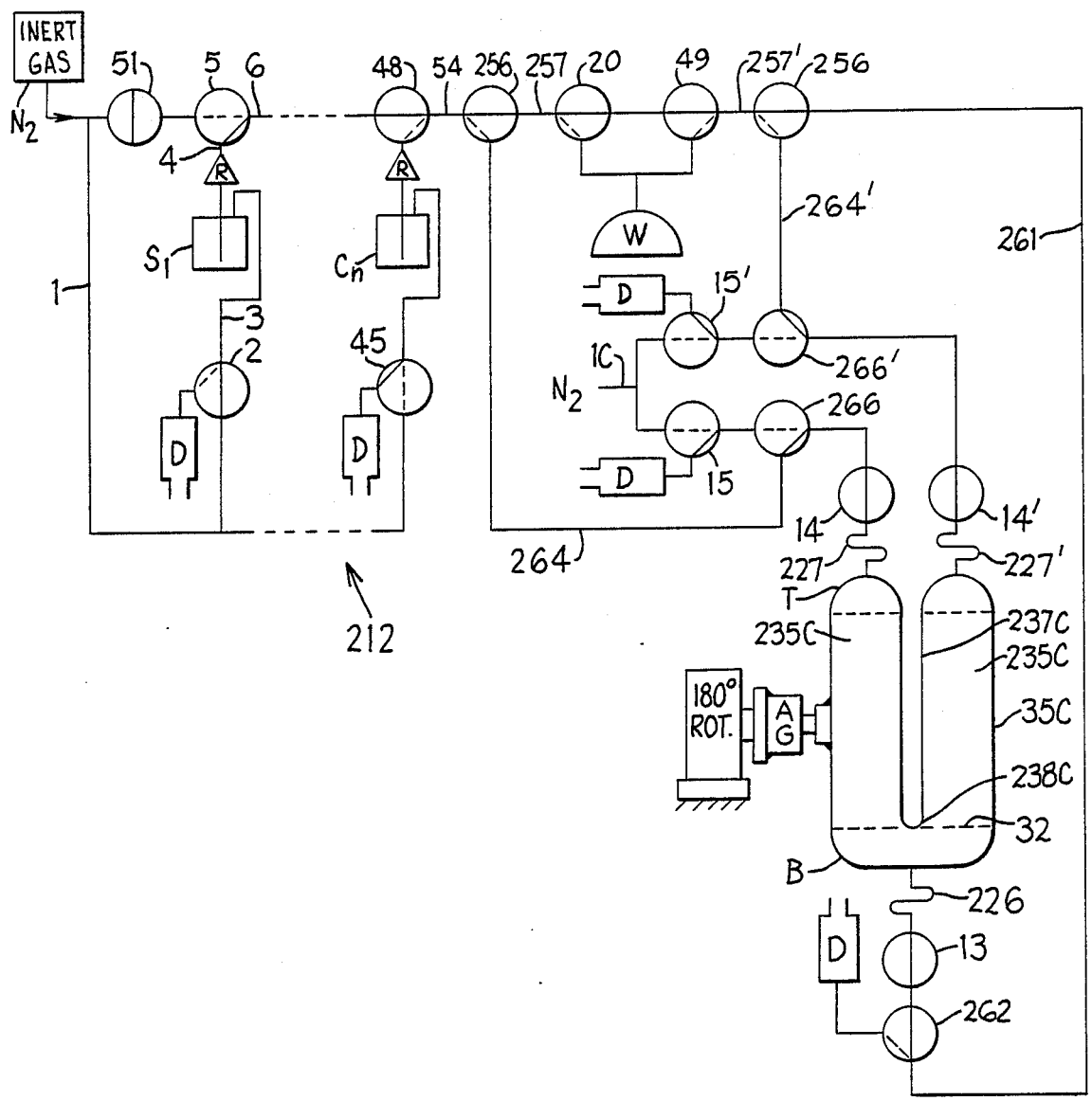
FIG. 9 diagrammatically shows an embodiment similar to that of FIG. 3, wherein the multi-chamber reaction vessel has a solid dividing wall.

FIG. 9 shows a further modified multi-chamber reaction vessel 35C provided as part of the modified reaction vessel assembly 218C also for synthesis of more than one peptide at a time. The reaction vessel assembly 218C is similar to the reaction vessel assembly 218B of FIGS. 3, 3A and 4 except for the following differences. In FIG. 9, the bottom portion 238C of the reaction vessel divider is a solid, nonporous, downward continuation of the upper part 237C of the divider and the divider has no porous part. This further avoids the possibility of cross-contamination when different reagents are present in the two chambers 235C and 235C' with the reaction vessel 35C in its upside-down position not shown (analogous to the FIG. 3A position). With the reaction vessel 35C in its upright position shown in FIG. 9, reagent entering the bottom B of the vessel through valves 262 and 13 will divide equally between the two chambers 235C and 235C' due to the identical cross-section of the two chambers and the identical nature of the portions of the filter 32 at the bottom of each such chamber.

The connections of the top T of the chambers 235C and 235' to the reagent selection assembly 212 (shown in FIG. 2) may be identical to the corresponding connections described above with respect to FIGS. 3 and 3A. However, FIG. 9 shows a further modification in that connection which may be used in the FIG. 3, 3A embodiment as well. More particularly, in FIG. 9, an additional pair of three-way valves 266 and 266' have their dotted line position interposed between corresponding valves 14 and 15 and corresponding valves 14' and 15' and it is the solid line position of such additional valves 266 and 266' which connects the corresponding two-way valves 14 and 14' to the corresponding line valves 256 and 256' above described with respect to FIG. 3. A corresponding change is that an extension 1C of the connection gas supply line 1 is connectable through the dotted line position of the valves 15 and 15' to the valves 266 and 266'.

Operation of this FIG. 9 valve arrangement is the same as discussed above with respect to FIG. 3 and 3A except for the following. To empty the reaction vessel 35C in its FIG. 9 upright position, the pressurized gas from the extension 1C is passed by switching the valves 15, 15', 266, 266' to their dotted line positions such that pressurized gas flows therethrough and through valves 14 and 14' into the chambers 235C and 235C' to drive leftover liquid reagent downward through valves 13 and 262, line 261, the solid line position of the valve 256' and the dotted line position of valve 49 to waste W. A further difference is that with vessel 35C in its 180° inverted position (not shown in FIG. 9 but analogous to the position of the vessel in FIG. 3A), reagents and premixing nitrogen gas from line 54 pass to the then downward facing ends T of chambers 235C and 235C' (individually at different times as above described) not through the valves 15 and 15' but rather through the additional valves 266 and 266'. Similarly, upon returning the vessel 35C to its upright FIG. 9 position, it is the valves 266 and 266', not the valves 15 and 15', which are in the path for transfer of leftover reagent liquid from valves 14 and 14' through lines 264 and 264', valves 256 and 256', and valves 20 and 49 to waste W. It should be noted that the FIG. 9 additional valves 266 and 266' make it possible, in the FIG. 9 upright position, for nitrogen gas from extension line 1C to be simultaneously applied to the tops of both chambers 235C and 235C'.

In both FIGS. 3 and 9 line cleaning with solvent (e.g. solvent $S_1$) and inert gas blow dry of line 6, 54 exhaust through the solid line position of valve 256, line 257, the dotted line position of valve 20, and thence through line 18 to waste W.

INDIVIDUAL VESSELS—COMMON REAGENT SUPPLY—FIG. 10

Figure 10:
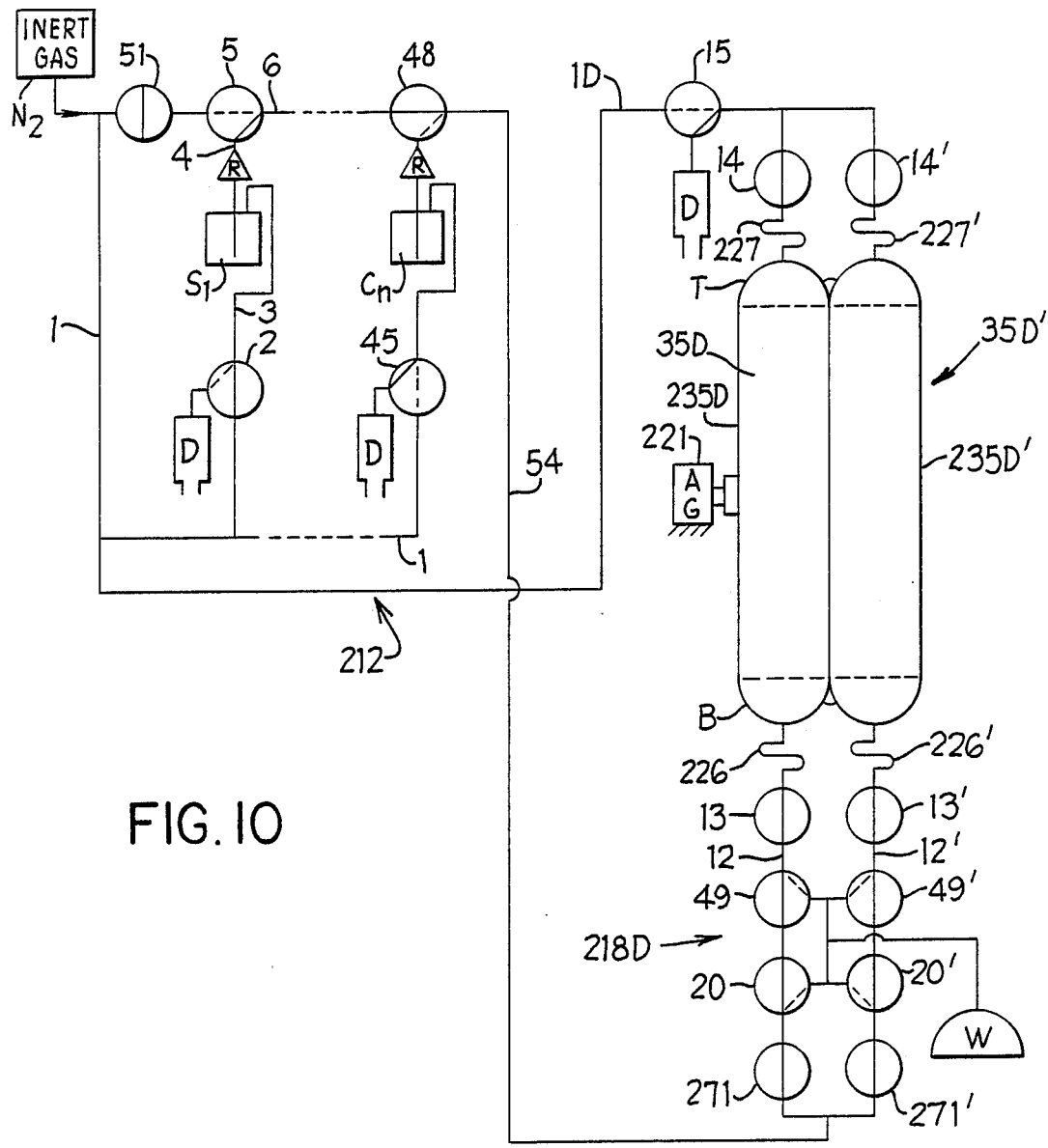
FIG. 10 diagrammatically shows an embodiment similar to FIG. 2 but utilizing plural independent reaction vessels.

FIG. 10 shows a further modified reaction vessel assembly 218D for substantially simultaneous synthesis of several peptide analogs. Rather than using a double-chamber single vessel, either with a partially porous divider 238 as in FIG. 3 or a nonporous divider as at 238C in FIG. 9, the FIG. 10 modification employs a multi-chamber peptide reaction vessel 35D which may be considered a plurality (here for example two) of isolated individual reaction vessels 35D and 35D' of single-chamber type, in which the individual chambers 235D and 235D' are devoid of any internal connection to each other. Instead, each chamber 235D and 235D' has individual fluid connections via flexible conduits 227 and 227' and two-way valves 14 and 14' at the top T and flexible conduits 226 and 226' and two-way valves 13 and 13' at the bottom B thereof. Fluid connections can be made to these two-way valves as in either FIG. 2 or FIG. 2A. In the embodiment shown, the reaction vessel assembly 218D is generally of the FIG. 2A type in which the multi-chamber vessel 35D is mounted by a fixedly supported agitator 221 (or otherwise provided with agitation or stirring means) and 180° rotation of the vessel 35D is thus not needed.

The top two-way valves 14 and 14' connect to a three-way vent valve 15. As in FIG. 2, the valve 15 normally vents the chambers 235D and 235D' to the drying tube D but is actuable to its dotted line position to pressurize such chambers at the top thereof from an extension 1D of the pressurized nitrogen line 1 for emptying the leftover liquid contents of the chambers. A reagent or premix nitrogen gas from line 54 enters leftward chamber 235D substantially as in FIG. 2A, namely through the solid line positions of waste valves 20 and 49 and two-way valve 13, and leftover process liquid is driven from the leftward chamber 235D also as in FIG. 2A, namely through two-way valve 13 and the dotted line position of waste valve 49 into waste W.

However, unlike in FIG. 2A, there is added in FIG. 10 a further three-way waste valve 49' having a solid line position permitting a reagent or premixing gas flow from line 54 to enter chamber 235D' through valve 13' and a dotted line position for emptying chamber 235D' through valve 13' to waste W. As a further difference, an extra pair of two-way valves 271 and 271' are interposed between the line 54 and waste valves 20 and 49'. Opening of valves 271, 20, 49' and 13' to their solid line positions shown admits flow from line 54 into chamber 235D and opening of valves 271, 20', 49' and 13' to their solid line positions shown admits flow from line 54 to chamber 235D'. Thus, depending on the settings of the valves 271 and 271', the same reagent or gas flow can be simultaneously admitted to both chambers 235D and 235D'. Alternately, by opening just one of valves 271 and 271' a particular reagent from line 54 can be admitted only to one of the chambers 235D and 235D' and after appropriate line washing steps a different reagent can be admitted from line 54 to the other of such chambers. For line washing, the line washing solvent (e.g. $S_1$) passes through line 6, 54, valves 271 and 271' and the dotted line position of valves 20 and 20' to waste W.

Thus, again two peptide analogs can be simultaneously prepared, which analogs differ by one or more amino acids in the series making up such peptides but are similar in another amino acid or amino acids such series. Again, the paths between the chambers 235D and 235D' and the waste valves 49 and 49', including lines 12 and 12', valves 13 and 13' and resilient lines 226 and 226', are preferably made as short as possible to minimize the possibility of cross-contamination therein. The valves 271 and 271' permit different amounts of reagent to be added to the respective chambers 235D and 35D', if desired.

INDIVIDUAL VESSELS—FLIP-FLOP CONNECTION—FIG. 11

Figure 11:
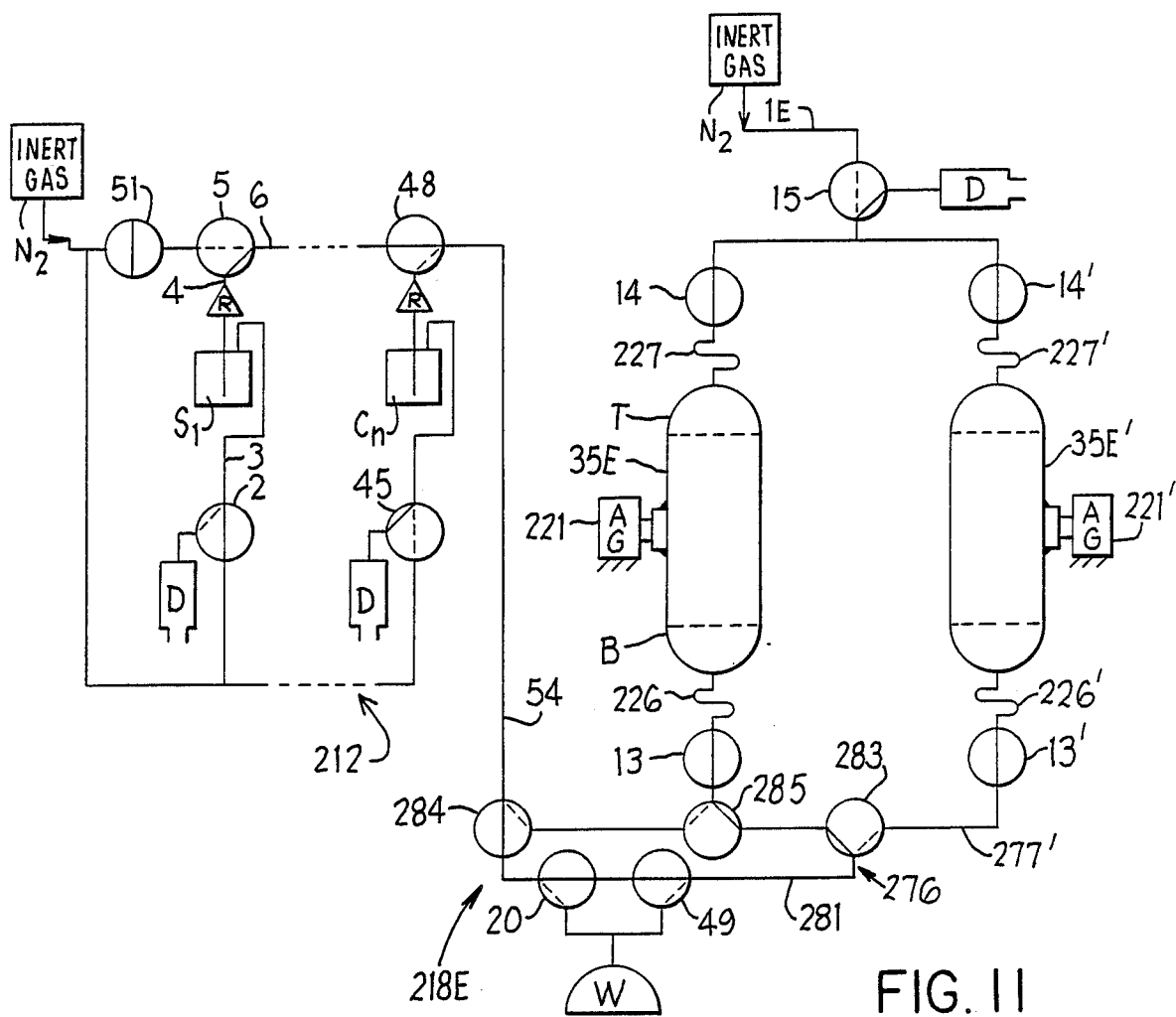
FIG. 11 diagrammatically shows a further embodiment similar to FIG. 10 but employing a flip-flop valve for supply reagent to separate reaction vessels.

Synthesis of more than one peptide analog at a time can also be carried out using the further modified reagent vessel assembly 218E of FIG. 11, in which two separate reaction vessels, either mounted together as in FIG. 10 or separately (e.g. with separate external agitators 221 and 221' if desired), are provided as here shown.

The vessels 35E and 35E' of FIG. 11 may be fed with liquid reagent or premixing inert gas through line 54 through a valve arrangement similar to that above described with respect to FIG. 10. However, in FIG. 11 this is done through a modified valve circuit interposted between line 54 and the two-way valves 13 and 13' and here comprising a symmetrical "T" connection at 276 which connects individual lines 277 and 277' from valves 13 and 13' to a single line 281 which is connected through the solid line positions of the waste valves 49 and 20 and valve 284 to the supply line 54. Reagent or premixing gas from line 54 thus passes through the solid line positions of valves 284, 20 and 49 through the "T" 276 and into whichever of the vessels 35E and 35E' that is selected by the valve 283. Residual liquid reagent is expelled from the reaction vessels alternately by applying nitrogen gas through line extension 1E and the dotted line position of valve 15 to blow out the contents of the reaction vessels upon opening of their valves 13 and 13', shifting of waste valve 49 to its dotted line waste position and switching the position of the valve 283 to the desired one of the vessels 35E and 35E', whereafter the other said vessel can be emptied by reversing the position of the flip-flop valve 283. As in the above-discussed figures, cleaning or drying of the line 54 is accomplished by cleaning reagent or nitrogen gas flowing through line 54 through valve 20 open to its dotted line waste position and hence to waste W.

If some unaccounted for asymmetry in the path from line 54 into each vessel 35E and 35E' should result in different amounts of reagent liquid thereinto at a given time period, such asymmetry can be compensated for by feeding reagent to vessel 35E for a first time period and then to the vessel 35E' for a second time period, with the time period lengths being adjusted to provide the compensation and assure entry of equal amounts of reagent into both vessels. This may be accomplished by the three-way "flip-flop" valve 283 at the "T" 276 as shown in FIG. 11. The same effect can be accomplished by omitting the flip-flop valve 283 and opening the valves 13 and 13' for nonoverlapping timed intervals. If the two-position valve 283 is present, it may be desired to add the two-position three-way valve 284 at the end of line 54 and a further two-position valve 285 connected between valves 283 and 13 in its solid line position shown and having a dotted line position connecting valve 284 with valve 13. Thus, a first reagent can be loaded from line 54 through valves 284, 20, 49, 283 and 13' into vessel 35E', the path through lines 6, 54 and valves 284 and 20 can be cleaned by flushing to waste W as above generally described with respect to FIG. 2, and a further reagent can be loaded (without contamination by the first reagent) into vessel 35E through the valves 284, 283 and 13.

MECHANICALLY PUMPED SUPPLY AND RECIRCULATION—FIG. 8

Figure 8:
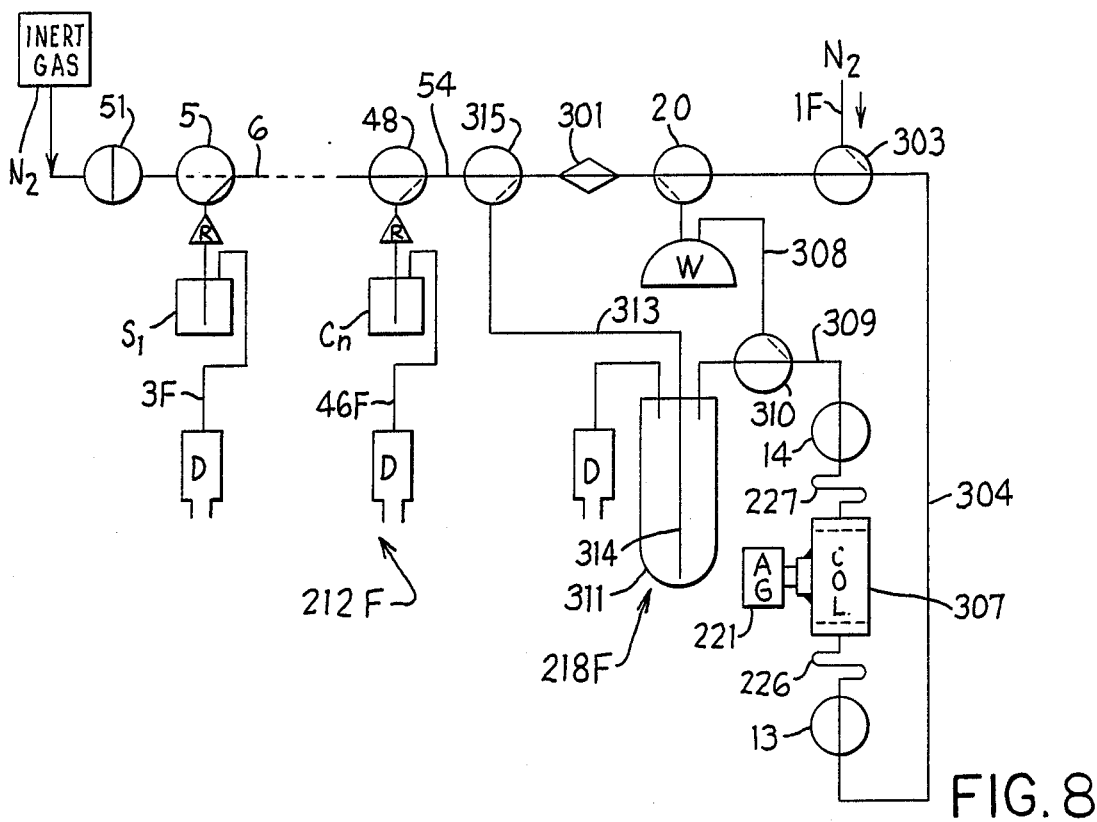
FIG. 8 diagrammatically shows a further peptide synthesizer modified to provide a pump-type reagent supply assembly feeding a recirculating column-type reaction vessel assembly.

FIG. 8 which shows a reagent selection assembly 212F modified for use of a mechanical pump to move liquids through the system, rather than nitrogen gas as in the reagent selection assembly 212 of FIG. 2. The FIG. 8 modified reagent selection assembly 212F differs from FIG. 2 assembly 212 in that its drying tubes D directly connect by lines 3F . . . 46F to the upper portion of the corresponding reagent containers $S_1 \ldots C_n$ and the FIG. 2 nitrogen gas line 1 and pressurization valves 2 . . . 45 are eliminated. In FIG. 8 a modified reaction vessel assembly 218F includes a pump 301 for drawing preselected amounts of liquid from the reagent selection assembly 212F. The pump may be periodically switched on and off. However, the pump 301 is preferably of the continuous run type capable of moving liquid at a preselected rate therethrough except when a valve downstream thereof is closed, in which case the pump 301 maintains liquid pressure thereagainst.

To supply a reagent from assembly 212F to assembly 218F, valve 315 is placed in its above-discussed solid line position with the pump 301 running and the reagent supply valve 5 . . . 48 associated with the particular desired one of the reagents $S_1 \ldots C_n$ is shifted from its normally closed (solid line) to its open (dotted line) position so that the pump draws that reagent. The pump 301 draws the selected reagent from the line 54 through the solid line position of a three-way valve 315 and propels it rightward through the solid line position of a waste valve 20 and a pressurized nitrogen supply valve 303, a line 304, two-way valve 13, resilient tube 226, a reaction column 307, flexible tube 227, two-way valve 14, a line 309 and the solid line position of a three-way valve 310 to the top of an overflow reservoir 311 to fill the reservoir 311 to the desired level. The top of the overflow reservoir 311 is vented by a drying tube D.

A pickup tube 314 extends down into the reservoir 311 to near the bottom thereof and is connected through a line 313 and the broken line position of three-way valve 315 back to the input end (leftward end) of the pump 301, such that the valves 20, 303, 13 and 14 in their solid line position and the valve 315 in its broken line position provide a continuous loop for liquid recirculation by the pump 301 through the column 307 and overflow reservoir 311. Thus, after such filling of reservoir 311 to the desired level, valve 315 is shifted to its broken line, recirculating position whereupon continuing operation of the pump 301 recirculates the reagent liquid in the overflow reservoir 311 back through the column 307. The column 307 is a conventional peptide synthesis column containing resin particles with starter amino acid (e.g. amino acid $AA_0$) much as above described with respect to reaction vessels 35–35E' above.

When the time of treatment by this reagent is completed, the valve 310 is shifted to its dotted line waste position connecting to waste W through a line 308. The pump 301 then empties the recirculation loop by pumping through the path 311, 314, 313, 315, 301, 20, 303, 304, 13, 14, 309, 310, 308 into waste W. The overflow container 311 and tube 314 are arranged to pump the former substantially dry by means of the pump 301. If desired, any remaining unused reagent liquid droplets in the path 304, 307, 310 can be blown to waste W by shifting gas supply valve 303 to its dotted line position whereupon nitrogen gas from pressurized line 1F moves through the latter path to waste.

To wash the line 54 free of such reagent, a cleaning reagent, for example solvent $S_1$, can be pumped through line 6, 54, solid line positioned valve 315, pump 301 and dotted line positioned valve 20 into waste W. In general, it would not be necessary to blow dry the line 6, 54 thereafter, but if such is desired, the FIG. 2 nitrogen two-way valve 51 and solvent $S_1$, reagent-gas supply valve 5 can be "opened" to the line 6, 54 apparatus, as in FIG. 2, the running pump 301 permitting the drying gas and residual droplets of reagent (if any) to go to waste W.

In FIG. 8, the flexible tubes 226 and 227 and the two-way valves 13 and 14 can be omitted as can any agitating or vibrating means, such as the agitator 221, if sufficient interaction between the reagent and the material in the column 307 is provided in the column 307 by recirculation by pump 301 of each reagent liquid.

The present invention provides a means responsive to shifting of one of the supply vlaves (e.g. 5) from its dotted line to its solid line position in FIG. 2 or FIG. 8 for moving reagent liquid from the corresponding reagent container (for example container $S_1$) through the portion of the supply valve line 6 downstream of such supply valve 5 toward the reaction vessel 35. In FIG. 2, for example, such means responsive to shifting is the compressed gas line 1, valve 2 and line 3 by which the reagent container $S_1$ can be pressurized prior to such shifting (opening) of the corresponding supply valve 5. On the other hand, as seen from the above description of FIG. 8, such means responsive to shifting of a supply valve can instead be the FIG. 8 pump 301.

RESERVOIR LEVEL SENSING—FIG. 7

Figure 7:
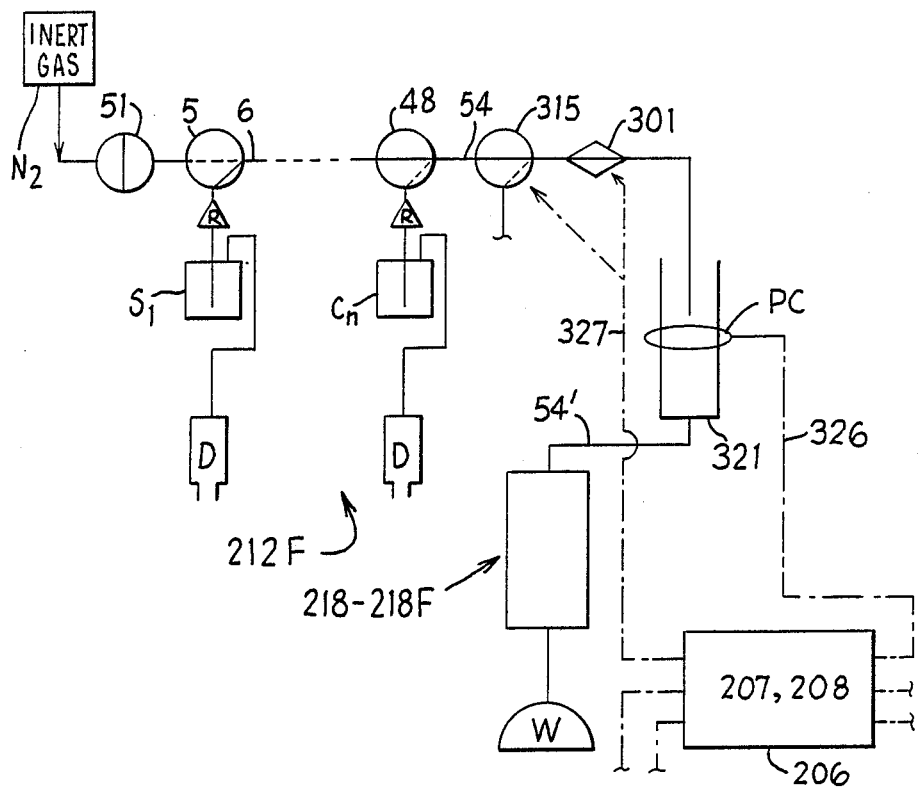
FIG. 7 diagrammatically shows a reagent reservoir filling control apparatus usable with the peptide synthesizers disclosed herein.

FIG. 7 merely indicates the possibility of controlling the amount of liquid drawn from any one of the reagent containers $S_1 \ldots C_n$ by shutting off the pump 301, or a valve in series therewith such as valve 315 of FIG. 8, by using a level sensing device such as a photocell PC (FIG. 7) to sense the amount of liquid pumped into a reservoir 321 in a reaction vessel assembly like those at 218–218F. A suitable control device, e.g. microprocessor 207, receives a photocell signal over electric signal line 326 when the reagent liquid in reservoir 321 rises to its level, whereupon the microprocessor 207 acts through electric power line 327 to turn off pump 301 or valve 315 to prevent further flow into reservoir 321. The measured amount of liquid in reservoir 321 may then be passed through an extension 54' of line 54 to the corresponding assembly 218–218F for use as above set forth. Instead of a microprocessor 207 in FIG. 7, a simple control relay can be substituted to turn off the pump 301 or valve 315.

PLURAL COLUMNS—COMMON SUPPLY—FIG. 6

Figure 6:
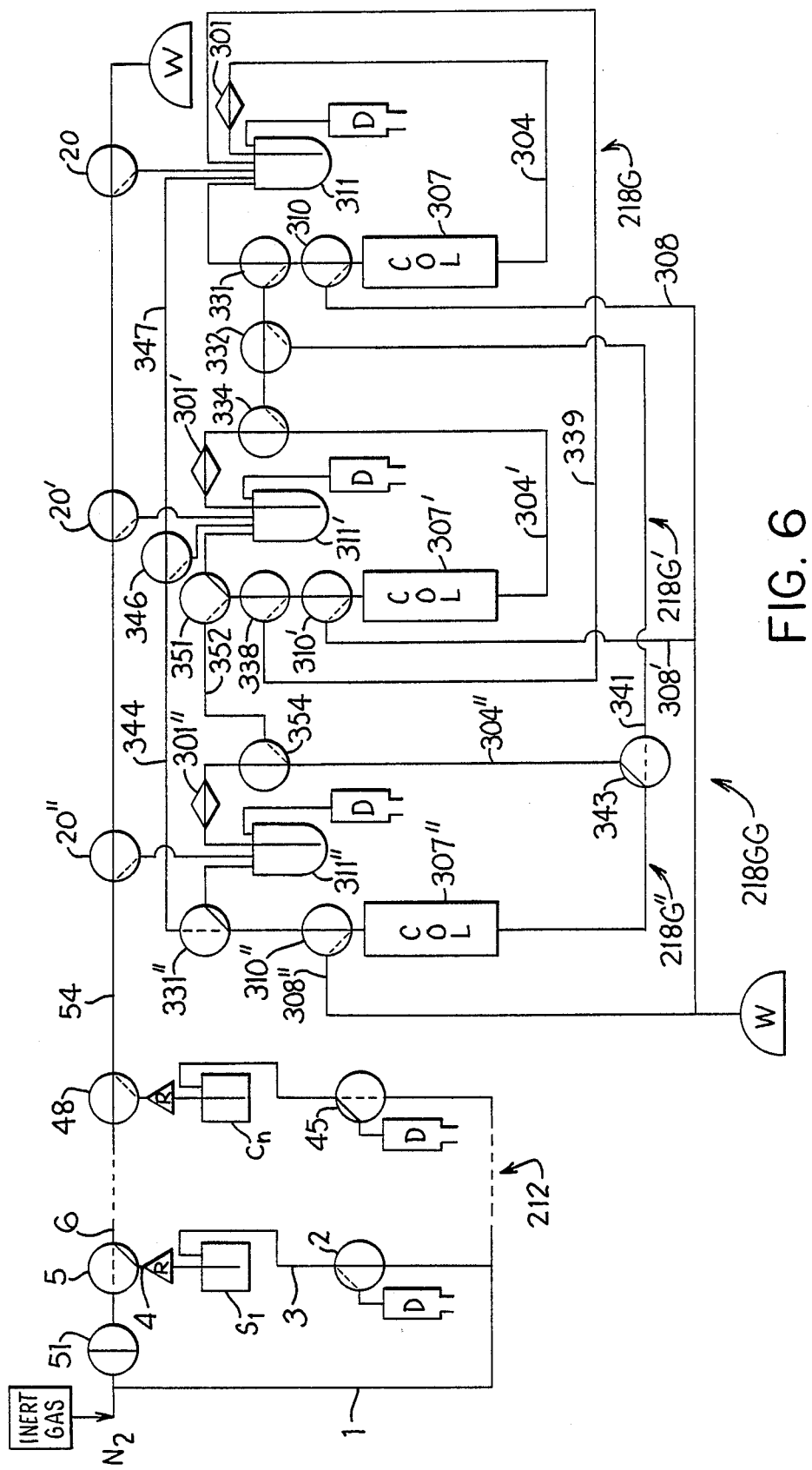
FIG. 6 diagrammatically shows a further peptide synthesizer using plural column-type reaction vessels with a FIG. 2 type reagent selection assembly.

FIG. 6 shows a still further apparatus for substantially simultaneous synthesis of different peptide analogs, wherein a plurality of separate reaction vessels (here in the form of conventional reaction columns) are alternately connectable in parallel and in series for, in any given synthesis step, supplying the several reaction columns with either the same or differing reagents.

In a particular embodiment shown in FIG. 6, the reaction vessel assembly 218GG comprises a plurality, here three, of preferably identical reaction vessel assemblies 218G, 218G' and 218G'' defining respective loops comprising respective pumps 301–301'', lines 304-304", columns 307-307", waste valves 310-310", and reservoirs 311-311".

The FIG. 6 assembly 218GG provides for the following alternatives in loading and circulating reagents:

1. Sequentially load three separate reagents (e.g. $AA_x$, $AA_y$ and $AA_z$) into respective reservoirs 311-311' and then simultaneously circulate them through respective columns 307-307".

2. Sequentially load two different reagents (e.g. $AA_x$ and $AA_y$) into any two reservoirs (e.g. reservoirs 311 and 311") and then simultaneously circulate one reagent $AA_x$ in reservoir 311 through columns 307 and 307' while the different reagent $AA_y$ in reservoir 311" circulates through its own column 307".

3. Load only one reagent (e.g. $AA_x$) into only one reservoir (e.g. reservoir 311) and circulate it through all columns 307-307" in series through its own column 307 and one other (307' or 307") or through only its own column 307.

4. Load only one reagent into all reservoirs 311-311' and simultaneously circulate the contents of each reservoir only through its own column.

If desired, the assemblies 218G-218G" may be identical to the reaction vessel assembly 218F of FIG. 8, which utilizes pump 301 not only to recirculate reagent from reservoir 311 back through the column 307, but also to initially supply reagent from the nonpressurized reagent container assembly 212F. However, in contrast to FIG. 8, and for purposes of illustration of a further modification, the reaction vessel assemblies 218G-218G" instead utilize their pumps 301-301" solely for recirculation of reagent through the columns 307-307" and reservoirs 311-311" and a reagent is supplied via line 54 by nitrogen gas pressurizing of line 1 in assembly 212 as described above in connection with FIG. 2.

Also in contrast with FIG. 8, the FIG. 6 valves 20-20" supply fresh reagent from line 54 to the respective reservoirs 311-311", rather than routing fresh reagent directly into the columns 307-307".

To supply a given reservoir (e.g. 311) with a reagent (or nitrogen gas) from line 54, such fluid is routed through the solid line position of any upstream supply valves (here 20" and 20') through the dotted line position of the corresponding one (e.g. 20) of the series valves 20-20" into such reservoir 311. Then line 54 can be cleaned, with the cleaning solvent (e.g. $S_1$) going through the solid line position of the series valves 20-20" to waste W. Then more reagent (different or the same) can be supplied to a different reservoir (e.g. 311' or 311") via line 54 and the dotted line position of the corresponding valve 20' or 20". Thus, the particularly series valving 20-20" shown does not permit simultaneous filling of the several reservoirs 311-311". This is not usually a disadvantage because usually the same reagent will not be loaded into all reservoirs 311-311" in a given synthesis step. Restated, foregoing alternate 4 will not normally be used, alternate 3 normally being more efficient for a single reagent step.

In each assembly 218G-218G" (e.g. 218G) of FIG. 6, the pump 301 is connectable in loop to draw reagent from near the bottom of its reservoir 311 and pump it through line 304, its column 307 and the solid line position of waste valve 310 back into its reservoir 311 to complete the recirculation loop through its reservoir and column.

To empty such a recirculation loop 301, 307, 311 of leftover reagent after a synthesis step, the corresponding waste valve 310 can be shifted to its dotted line position and the pump 301 draws all the leftover reagent liquid from the reservoir 311 and drives same through column 307, valve 310 and line 308 to waste W. Each recirculation loop (single or multiple column) is emptied in a corresponding manner. The pump 301 is preferably of a type (for example a peristaltic pump) capable of propelling all such reagent liquid therethrough and then pumping a plug of air to move the last of such liquid through the column 307, waste valve 310, and waste line 308 to waste W.

The FIG. 6 assembly 218GG includes valved paths permitting a particular reagent in one of reservoirs 311-311" to circulate through more than one of the columns 307-307" to implement alternatives 1 and 2 above.

First, consider alternative 2. For example, reagent liquid circulated from reservoir 311 by pump 301 through column 307 and valve 310 may then be routed through the dotted line position of a valve 331, the solid line position of a three-way valve 332 and the dotted line position of a further three-way valve 334 to the column 307' and thence through the dotted line position of a return three-way valve 338 and a return line 339 back to the reservoir 311. Thus, liquid from reservoir 311 circulates through both columns 307 and 307'. A different reagent may simultaneously circulate within the loop 301", 307", 311", which includes the solid line positions of further three-way valves 354 and 331".

The valve 331 in its solid line position completes the loop portion between waste valve 310 and reservoir 311. The valve 334 in its solid line position completes the loop portion between the adjacent pump 301' and column 307' and when in its dotted line position blocks passing of a liquid by pump 301'.

As a further example, valve 332 may instead be thrown into its dotted line position to cause reagent liquid pumped from reservoir 311, column 307 and the dotted line position of valve 331 to instead pass through a line 341 and the dotted line position of a valve 343, the column 307", the solid line position of valve 310", the broken line position of valve 331", a return line 344, the solid line position of a valve 346 and a line 347 back to the top of reservoir 311. Thus, liquid from reservoir 311 is circulated through columns 307 and 307". Simultaneously therewith, a different reagent liquid may be circulated through the loop 301', 307', 311', which includes the solid line position of a further three-way valves 351.

As a further example, the liquid in reservoir 311' may be circulated beyond its column 307', through the dotted line position of valve 351, a line 352, the broken line position of a valve 354, line 304", the solid line position of valve 343, column 307", the solid line position of valve 310", the dotted line position of valve 331", a line 344 and the dotted line position of a valve 346 back to reservoir 311'. Simultaneously, a different reagent may circulate in the loop 301, 307, 311.

Under alternative 1, liquid from reservoir 311 is circulated by pump 301 through column 307 and also through columns 307' and 307" in series back to reservoir 311. Reagent circulation would thus be from reservoir 311 through pump 301, column 307, dotted line positioned valve 331, solid line positioned valve 332, dotted line positioned valve 334, column 307', dotted line positioned valves 351 and 354, solid line positioned valve 343, column 307", dotted line positioned valve 331", solid line positioned valve 346 and a line 347 back to reservoir 311.

Thus, FIG. 6 provides for simultaneous preparation of three identical peptide batches or up to three different peptide analogs in which some steps require application of the same reagent to all columns and other steps require application of different reagents to different columns.

Thus, at any point in the synthesis where the peptide analogs being formed in columns 307-307" are to be treated with individualized (differing) reagents, either each column is isolated or a specific column is separated from the rest. The specific reagents are delivered to each loop separately without cross-contamination. By providing one pump column, the individualized reagents can be simultaneously circulated in their corresponding pump-column loops.

Figure 13:
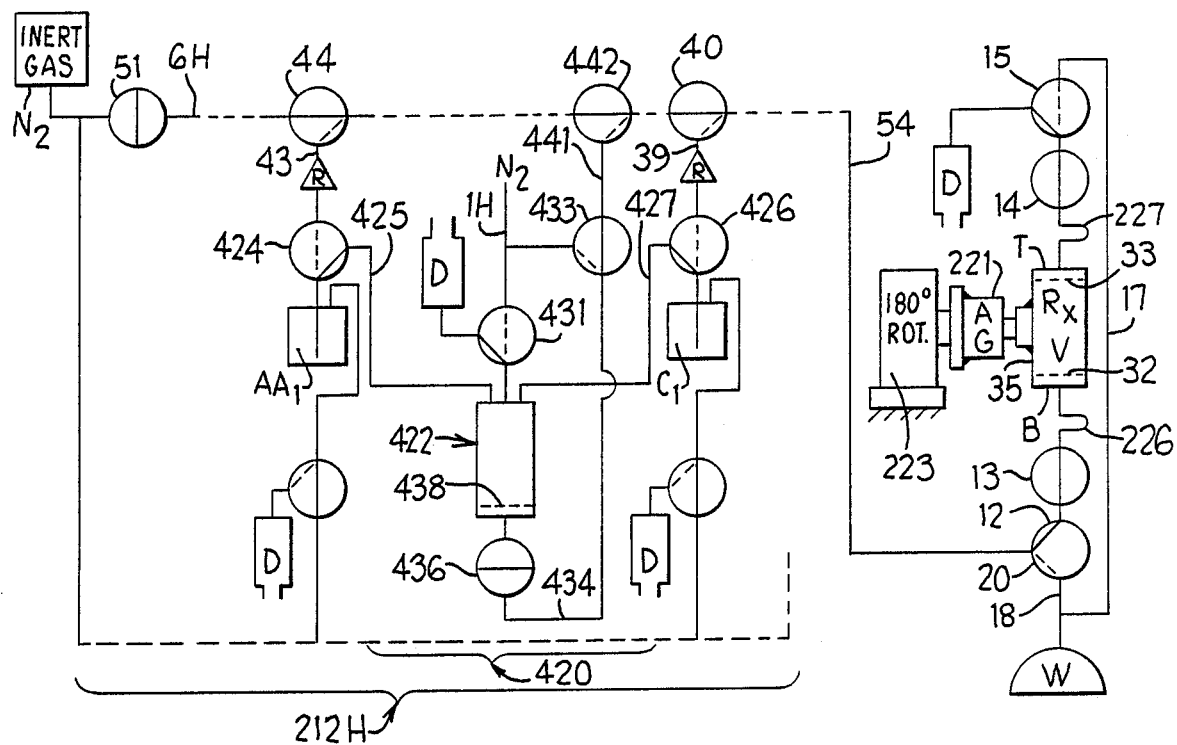
FIG. 13 diagrammatically shows a modification of the FIG. 2 reagent selection assembly which provides for preactivation of an amino acid with a coupling reagent prior to application to the reaction vessel.

PREACTIVATION OF AMINO ACID WITH COUPLING REAGENT PRIOR TO REACTION VESSEL—FIG. 13

FIG. 13 shows a reagent selection assembly 212H similar to assembly 212 above described with respect to FIG. 2, but modified by addition of preactivating structure 420 to permit preactivating of a given amino acid (for example $AA_1$) with the desired coupling reagent (for example $C_1$), such that the amino acid has already been reacted with its coupling reagent to form an active ester (a liquid) and a side product (a solid) prior to application through line 54 to the reaction vessel. The FIG. 13 modified apparatus thus permits a modification of coupling step 17 of the method of Example 1 above, such that an active ester, rather than the amino acid and corresponding coupling reagent, individually in sequence, would be applied to the reaction vessel.

The FIG. 13 modification permits bringing reacting of an amino acid and its coupling reagent substantially earlier than in Example 1, Step 17, for example between earlier steps of Example 1 and, if desired, even prior to Step 1 of Example 1, if substantial time is needed to interact the amino acid with its corresponding coupling reagent. Thus, by reacting of a given amino acid and coupling reagent simultaneously with earlier steps of the generalized method set forth in Example 1, the time required to add each successive amino acid to the peptide chain in the reaction vessel may be reduced and correspondingly the overall time required to prepare a multi amino acid peptide can be correspondingly reduced.

Also, such reacting of the amino acid and its coupling reagent in the container 422 permits close temperature control during the reaction by controlling (in conventional manner) the temperature of container 422.

Also, such reacting in the container 422 prevents reaction of the coupling reagent with an amino acid side chain on the resin in the reaction vessel.

Also, such reacting in the container 422 prevents removal of a protecting group on an amino acid side chain on the resin in the reaction vessel.

Also, the resulting preactivated amino acid (active ester) from the container 422 will react very quickly with the end terminus of the peptide chain in the reaction vessel 35.

Accordingly, the FIG. 13 modification will speed synthesis of a peptide, especially a long chain peptide, and produce a higher quality peptide product.

It will be understood that the FIG. 13 modification is described in terms of an amino acid $A_1$ and coupling agent $C_1$ by way of example only and that various amino acids and coupling reagents may be utilized.

In the particular example shown in FIG. 13, the preactivating structure 420 includes a preactivating container 422. Three-way valves 424 and 426 are interposed between the corresponding reagent containers $AA_1$, $C_1$ and their respective three-way supply valves 44, 40. The dotted line position of the interposed valves 424 and 426 permits connection of the reagent containers $AA_1$, $C_1$ directly to their corresponding three-way supply valves 44, 40 as in FIG. 2. However, the valves 424, 426 are shiftable to their solid line positions for pumping of reagents $AA_1$ and $C_1$ through respective lines 425 and 427 into the top of preactivating container 422. The container 422 is vented at the top thereof through the solid line position of a further three-way valve 431 to a drying tube D to permit entry of such reagents thereinto.

In the embodiment shown, the reagent containers $AA_1$ and $C_1$ are pressurized with nitrogen gas from the line 1 in the manner above described with respect to FIG. 2, in order to drive the corresponding liquid reagents through the valves 424 and 426 to the preactivating container 422. If the reagent containers $AA_1$ and $C_1$ are not of pressurizable type, but instead are to be mechanically pumped, as above discussed with respect to FIG. 8, suitable pumps (not shown) may be interposed in the lines 425 and 427. Once the desired amount of reagents $AA_1$ and $C_1$ has been supplied to the container 422, the containers $AA_1$ and $C_1$ are vented to the atmosphere by shifting to the solid line positions of their corresponding pressurization and venting valves 41 and 37, and shifting to their dotted line positions the valves 424 and 426, such that the reagent vessels $AA_1$ and $C_1$ are now isolated from the preactivating container 422.

Thereafter, the reagents within container 422 are interreacted. In the embodiment shown, the pressurized source $N_2$ of inert gas connects through an extension 1H of above-described line 1, the dotted line position of a further three-way valve 433 and a line 434 into the bottom of the container 422. If desired, and to prevent premature draining of the container 422 into the line 434, a normally closed two-way valve 436 may connect the line 434 to the bottom of the container 422. With the valve 433 in its dotted line position and the two-way valve 436 open, nitrogen gas on line 1H can enter and bubble up through the reagent liquids $AA_1$ and $C_1$ in the container 422 to hasten mixing thereof. Excess gas in container 422 is vented through valve 431 to dryer D.

A filter 438, such as a glass frit filter, is provided at the bottom of container 422 adjacent the opening to valve 436 and line 434 to permit draining of active ester liquid downward from container 422 but blocking passage therethrough of unwanted side products, which are of solid or semi-solid form and result from interacting of the amino acid with its coupling reagent.

The preactivating unit 420 further includes a three-way valve 442 which in its normal solid line position of FIG. 13 continues the line 6H through the various supply valves 5 . . . 44 . . . 40 . . . 48 to the line 54. To supply the active ester in container 422 to the line 54, the valves 431, 436, 433 and 442 are shifted to positions which shut off the pressurized gas flow to line 434 and the venting of container 422 through dryer D, and which instead permit pressurized gas to flow through line 1H and the dotted line position of valve 431 into the top of container 422 to drive the active ester therein downward through filter 438, valve 436, line 434, valve 433, line 441 and the valve 442 (in its dotted line position), into the portion of line 6H downstream (to the right) of valve 442 and thence through line 54 toward the reaction vessel 35.

Figure 12:
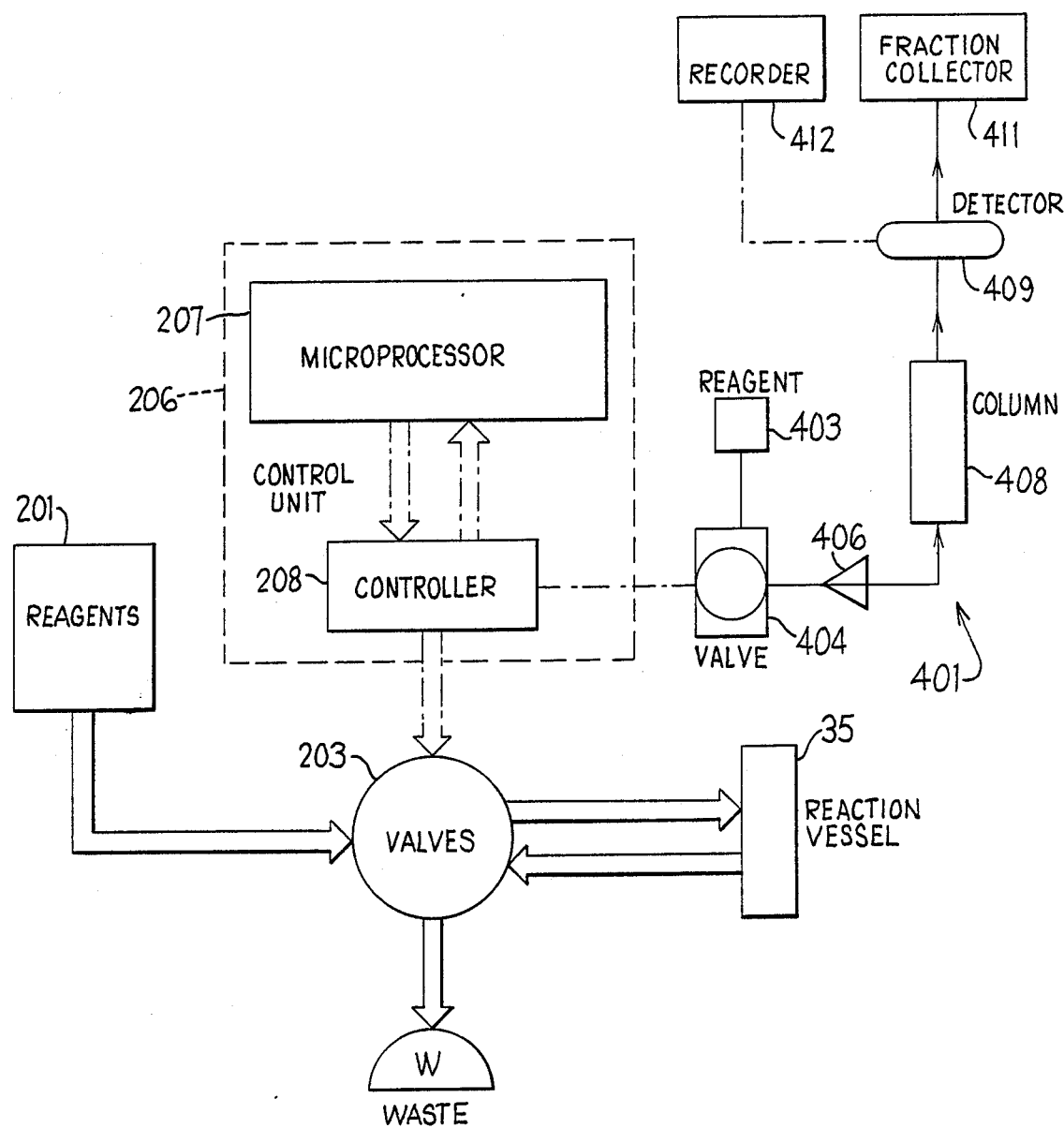
FIG. 12 is a diagrammatic view similar to FIG. 1 and showing control of an accessory device by the control unit of the peptide synthesizer.

Further preactivating structures 420 can be provided for each desired amino acid-coupling reagent combination. Alternately, by addition of suitable valving for cleaning and switching of reagents, a single preactivating container 422 can serve where not more than one amino acid-coupling reagent at a time is to be interacted.

Where the control unit 206 (FIG. 1) is of microprocessor type, the major cost of the solid phase peptide synthesizer may be the programmed microprocessor. It is contemplated, however, that the microprocessor cost can be more reasonably justified by spreading it over several related systems. For example, in addition to controlling the peptide synthesis, the microprocessor 207 could be employed simultaneously to control other peptide chemistry systems, such as a low pressure chromatography system 401 (FIG. 12) for preparative purification of peptide. The low pressure chromatography system 401 is conventional and includes, as shown in FIG. 12, a reagent supply 403, a valve 404 controlled by unit 206, a pump 406, a chromatography column 408, a low pressure chromatography detector 409, fraction collector 411 and data recorder 412, wherein the valve 404, under control of the unit 206, supplies reagent from source 403 to pump 406 which sends same through the column 408, fractions from the column being detected at 409, detector 409 being monitored by recorder 412, so that desired fractions can be collected at 411.

Although operation of the above-described apparatus has been discussed, by way of example, in terms of synthesis of one or more peptides or proteins on insoluble polymeric supports, the same apparatus could be used for other purposes, such as a nucleotide synthesizer, and amino acid analyzer, a protein sequencer, or for other types of chemical processes. The sequential arrangement of liquid containers $S_1 \ldots C_n$ in assemblies 212 and 212F, which reduces cross-contamination, and the arrangement of assemblies 212 and 212F in combination with the downstream assemblies 218–218G which provides the capability for draining and flushing the entire liquid system, further reduces cross-contamination and is particularly suited for automatic control of peptide synthesis. The disclosed apparatus, particularly of FIGS. 3, 6, and 9–12, exemplify the important capability of the present invention to provide for simultaneous synthesis of several differing peptide analogs from a common reagent supply and with only a minimum number of extra parts being added to the apparatus for each additional peptide analog involved in the simultaneous synthesis of multiple peptide analogs.

Further as to FIG. 1, it is contemplated that the disclosed apparatus may be equipped to constantly monitor both temperature and effective acidity or basicity ("pH") throughout the course of a synthesis. This feature is particularly useful when large-scale reactions are being performed (i.e. pilot plant applications).

To monitor the temperature, a sensitive (for example plus or minus 0.05° C.) temperature probe, or temperature sensor, TS can be provided on each reaction vessel 35. A separate connection from this probe to the control unit 206 allows for either a permanent recorded record of temperature and/or an automatic alarm AL actuation in case the temperature should fall outside of preprogrammed allowed limits. Alternately, an automatic temperature traction can be effected by providing the reaction vessel with a conventional heating-cooling means HC (e.g. refrigeration coils, a heating tape, a hot or cold water supply, etc.). The acidity or basicity of the contents of the reaction vessel 35 can constantly be monitored by the control unit 206 by means of a conductivity probe or sensor provided on the reaction vessel 35. As with temperature control, pH control is most appropriate for large scale reactions, but can prove useful as a failsafe synthesis check in smaller scale syntheses. A written record of pH changes can be provided via a strip chart recorder RE. The program for microprocessor 207 can be correlated to the anticipated conductivity values expected for each step of the synthesis and the synthesis can be automatically interrupted if these pH values do not correspond to the previously programmed expectations. If this should occur, the operator can be alarmed by an alarm at AL.

It is contemplated that the control unit 206 can be arranged to incorporate a number of capabilities and such may be readily implemented by means of a programmed microprocessor. Contemplated possible capabilities include preprogramming for single or multiple variation of solid phase peptide syntheses, programming of simultaneous or multiple syntheses, constant interaction of various monitored systems (such as pH, temperature, ultraviolet monitors) with safety checks and automatic correction and/or interrupt of synthesis at a given step, recording synthesis steps by means of an auxiliary recording or printout device, alarms for additional potential problems such as low reagent level in reagent containers or need to prepare fresh reagents, control of automatic preparation of preactivated amino acids with appropriate temperature control, control of automatic low pressure preparative chromatography (LPC) as in FIG. 12, operator training capabilities including strategy aids for the novice operator, and built-in self-diagnostics.

The above-described embodiments have considerable advantageous characteristics in terms of liquid transfer. All of the foregoing embodiments provide for periodic delivery of discrete quantities of reagents to the reaction vessel (S) as above described with respect to FIGS. 2, 3, etc., which permit control of valves in various ways, including by microprocessor control, wherein self-cleaning of fluid lines is provided and wherein is provided the ability to perform repeated couplings, multiple cycles, and even simultaneous multiple syntheses and wherein the number of reagents, for example amino acids, is virtually unlimited. Further, and particularly as demonstrated by the FIG. 6 embodiment, it is possible to provide continuous pump-driven recirculation of reagents through a loop including a reaction vessel and reagent replenishment reservoir. In each of the above-disclosed embodiments, monitoring and safety check provisions can be included, as above generally discussed with respect to FIG. 1.

The pump 301 of FIG. 8 is preferably a conventional, fast, self-priming pump. Such pump may be more precise in measuring fluid supplied to the column 307 than the FIG. 2 gas pressurized, timeable flow delivery.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Appparatus usable for peptide synthesis and the like, comprising:
   a reaction vessel;
   a plurality of supply valves connected in series in a supply line, the supply line having an upstream end and a downstream end, said supply valves each being constructed so as to provide alternate flow paths therethrough corresponding to alternate first and second postions thereof, said valves each being positionable in said first position for fluid flow therethrough from said upstream end of the line to said downstream end of said line;
   a plurality of reagent containers for containing respective reagents, and reagent flow lines connecting said reagent containers to said supply line, said supply valves each being in flow communication with a corresponding one of said flow lines, said supply valves each in its said second position connecting one of said reagent containers through the portion of said supply line downstream thereof and disconnecting said downstream portion of said supply line from the portion of said supply line upstream thereof;
   means for connecting the downstream end of said supply line to said reaction vessel;
   means responsive to shifting of one of said supply valves to its second position for moving reagent liquid from the corresponding said reagent container, through the portion of said supply line extending downstream of said one of said supply valves in its second position, toward said reaction vessel;
   a source of inert gas under pressure;
   a gas flow line connecting said gas source to the upstream end of said supply line and including an on/off valve actuable for blowing liquid out of said supply line, with said supply valves in their first position;
   said means for moving regent liquid including a plurality of pressurizing and venting valves, pressurizing flow lines connecting each said pressurizing and venting valve to a corresponding reagent container and further gas flow lines connecting said pressurizing and venting valves to said gas source, said pressurizing and venting valves each having a first position for venting said corresponding reagent container and an alternate second position connecting said corresponding reagent container to said pressurized gas source for pressurizing said corresponding reagent container from said pressurized gas source, such that with said supply valve and the corresponding pressurizing and venting valve in their second positions, reagent liquid from the corresponding reagent container is supplied through the portion of said supply line which is positioned downstream of said second positioned supply valve and the downstrem ones of said supply valves in their first positions to flow toward said reaction vessel; and
   a plurality of preadjustable flow restriction means each interposed in a corresponding one of said reagent flow lines between one of said reagent containers and the corresponding supply valve of said supply line and adjustable for the same flow rate into said reaction vessel regardless of which of said reagent containers is supplying said reaction vessel, to allow accurate loading of said reaction vessel by timing open periods of said supply valves.

2. Apparatus usable for peptide synthesis and the like, comprising:
   a reaction vessel;
   a plurality of supply valves connected in series in a supply line, the supply line having an upstream end and a downstream end, said supply valves each being constructed so as to provide alternate flow paths therethrough corresponding to alternate first and second positions thereof, said valves each being positionable in said first position for fluid flow therethrough from said upstream end of the line to said downstream end of said line;
   a plurality of reagent containers for containing respective reagents, and reagent flow lines connecting said reagent containers to said supply line, said supply valves each being in flow communication with a corresponding one of said flow lines, said supply valves each in its said second position connecting one of said reagent containers through the portion of said supply line downstream thereof and disconnecting said downstream portion of said supply line from the portion of said supply line upstream thereof;
   means for connecting the downstream end of said supply line to said reaction vessel;
   means responsive to shifting of one of said supply valves to its second position for moving reagent liquid from the corresponding said reagent container, through the portion of said supply line extending downstream of said one of said supply valves in its second position, toward said reaction vessel;
   waste outlet means for receiving waste fluids;
   a drying tube;
   a source of inert gas under pressure;
   a gas flow line connecting said gas source to the upstream end of said supply line and including an on/off valve actuable for blowing liquid out of said supply line, with saisd supply valves in their first position, in which said reaction vessel has an outlet in its top;
   said means connecting the downstream end of said supply line to said reaction vessel comprising waste valve means, and flow lines connecting said waste valve means to said supply line and reaction vessel and waste outlet means, said waste valve means being shiftable to connect said supply line alternately to a bottom of said reaction vessel or to said waste outlet means;
   means mounting said reaction vessel for inverting to place the top thereof downwardly;
   vent valve means and flow lines connecting said vent valve means to the outlet in the top of said reaction vessel and drying tube and waste outlet means, said vent valve means being alternately shiftable to vent the outlet in the top of said reaction vessel through sais drying tube during reagent flow into the bottom of said vessel, the vent valve means being alternatively shiftable to a posiiton connecting the outlet in the top of the reaction vessel with the waste outlet means for emptying the inverted reaction vessel, said supply valves all being shiftable to their first position and said on/off valve being openable for flowing of pressurized gas through said supply valve line and into the bottom of said reaction vessel to drive residual reagent liquid therefrom to said waste outlet means.

3. Apparatus usable for peptide synthesis and the like, comprising:

a reaction vessel;

a plurality of supply valves connected in series in a supply line, the supply line having an upstram end and a downstream end, said supply valves each being constructed so as to provide alternate flow paths therethrough corresponding to alternate first and second positions thereof, said valves each being positionable in said first position for fluid flow therethrough from said .upstram end of the line to said downstream end of said line;

a plurality of reagent containers for containing respective reagents, and reagent flow lines connecting said reagent containers to said supply line, said supply valves each being in flow communication with a corresponding one of said flow lines, said supply valves each in its said second position connecting one of said reagent containers through the portion of said supply line downstream thereof and disconnecting saisd downstream portion of said supply line from the portion of said supply line upstream thereof;

means for connecting the downstream end of said supply line to said reaction vessel;

means responsive to shifting of one of said supply valves to its second position for moving reagent liquid from the corresponding said reagent container, through the portion of said supply line extending downstram of said one of said supply valves in tis second position, toward said reaction vessel;

said reagent containers including at least one container for an amino acid and at least one container for a coupling reagent;

a preactivating container and flow lines including transfer valve means connecting said preactivating container to said at least one container for an amino acid and said at least one container for a coupling reagent, said transfer valve means being actuable for applying a first amino acid and coupling reagent from the at least one corresponding amino acid and coupling reagent containers to said preactivating container, said plural supply valves including at least one activated amino acid supply valve in series in said supply line, and a flow line from said preactivating container to said activated amino acid supply valve, said flow line including outlet means actuable for supplying thus acitvated amino acid from said preactivating container through said last-mentioned valve to said supply line and hence to said reaction vessel.

4. The apparatus of claim 3 including filter means positioned and arranged with respect to said outlet means for blocking escape from said preactivating container of solid side products.

5. Apparatus usable for peptide synthesis and the like, comprising:

a reaction vessel;

a plurality of supply valves connected in series in a supply line, the supply line having an upstream end and a downstream end, said supply valves each being constructed so as to provide alternate flow paths therethrough corresponding to alternate first and second positions thereof, said valves each being positionable in said first position for fluid flow therethrough from said upstream end of the line to said downstream end of said line;

a plurality of reagent containers for containing respective reagents and reagent flow lines connecting said reagent containers to said supply line, said supply valves each being in flow communication with a corresponding one of said flow lines, said supply valves each in its said second position connecting one of said reagent containers through the portion of said supply line downstream thereof and disconnecting said downstream portion of said supply line from the portion of said supply line upstream thereof;

means for connecting the downstream end of said supply line to said reaction vessel;

means responsive to shifting of one of said supply valves to its second position for moving reagent liquid from the corresponding said reagent container, through the portion of said supply line extending downstram of said one of said supply valves in its second position, toward said reaction vessel;

a source of inert gas under pressure;

a gas flow line connecting said gas source to the upstream end of said supply line and including an on/off valve actuable for blowing liquid out of said supply line, with said supply valves in their first position; and control means for controlling the amount of reagent delivered to the reaction vessel and the temperature of said reaction vessel and means connected between said control means and reaction vessel for constant monitoring of the pH of the contents of said reaction vessel by said control means throughout the course of a synthesis.

6. The apparatus of claim 5 further including a low pressure chromatography apparatus for preparative pruification of peptides, said chromatography apparatus including a chromatography column, a column feed valve and a flow line connecting said column feed valve to said chromatography column for passing reagents through the chromatography column, means for connecting one of said reagent containers to said valve and means connecting said control means to said column valve for operating said column feed valve form said control means.

7. Apparatus usable for peptide synthesis or the like comprising:

reaction vessel means including a plurality of reaction chambers;

waste receiving means for receiving leftover liquids from said reaction chambers;

a source of reagents and a supply line for supplying reagents from said source to said plural reaction chambers;

means connecting said supply line to (1) said plurality of reaction chambers for supplying reagent liquid thereto and (2) said waste receiving means for flushing resdual contents of said supply line to waste, said means including individual paths interconnecting said supply line and reaction chambers and waste receiving means, said individual paths connected to each said reaction chamber including valve means actuable for supplying a first reagent from said supply line to as first said reaction chamber and thereafter supplying a second reagent from said supply line to a second said reaction chamber and alternately actuable for supplying the same reagent from the supply line to said first reaction chamber and to said second reaction chamber;

each of said reaction chambers having a top and a bottom, means for inverting said reaction chambers to place the top thereof downward, said reaction chambers having a common port at the bottom thereof and individual ports at the top thereof, each said port being connected to said supply line through one of said individual paths, one of said valve mans being actuable for supplying a common reagent liquid simultaneously to the bottom of both said first and second reaction chambers with said chambers upright and said bottom downward, a source of pressurized inert gas and means actuable for supplying said gas along one of said individual paths to the port at the top of at least one of said chambers for discharging residual liquid from the bottom of said reaction chambers through another of said individual paths thereof to said waste receiving means, said valve means in said individual paths to the ports at the top of said chambers being actuable for supplying reagent liquid from said supply line sequentially to said chambers with said chambers in their inverted position such that their tops are downward, said valve means in said individual paths to the tops of said chambers being alternately actuable for supplying, in succession, different reagents from said supply line to said chamber tops to enable synthesizing of differing peptide analogs in said chambers.

8. The apparatus of claim 7 in which said reaction vessel means comprises a single reaction vessel including means dividing same into said chambers, said chambers each having a top portion and a bottom portion, said dividing means being solid and impervious to liquid transfer therethrough at least at the top portions of said chambers and including porous means permitting liquid communication between the bottom portions of said chambers but precluding transfer of solids therebetween.

9. The apparatus of claim 8, in which said reaction vessel means includes antisplash means protruding into the central portion of the chambers thereof for preventing, when the reaction vessel means is tops down, splashing of agitated liquid from the separated down facing tops therof up into adjacency with the then upward bottom thereof and therewith for avoiding unwanted cross-contamination of liquids in said chambers.

10. Apparatus usable for peptide synthesis or the like comprising:

reaction vessel means including a plurality of reaction chambers;

waste receiving means for receiving leftover liquids from said reaction chambers;

a source of reagents and a supply line for supplying reagents from said source to said plural reaction chambers;

means connecting said supply line to (1) said plurality of reaction chambers for supplying reagent liquid thereto and (2) said waste receiving means for flushing residual contents of said supply line to waste, said mens including individual paths containing valve means. and leading to each said reaction chamber, said valve means being actuable for supplying a first reagent from said supply line to a first said reaction chamber and thereafter supplying a second reagent from said supply line to a second said reaction chamber and alternately actuable for supplying the same reagent from the supply line to said first reaction chamber and to said second reaction chamber;

chamber venting means for venting said chambers;

said reaction chambers being closed to each other, a source of inert gas under pressure, means including a valve actuable to communicate one end of said chambers alternately with (1) said chamber venting means and (2) said source of gas under pressure, ones of said valve means being interposed between the other end of said chambers and said waste receiving means and supply line, said ones of said valve means being actuable for coupling said supply line alternately (1) to said reaction chambers simultaneously for supplying the same reagent thereto and (2) to individual chambers in sequence for supplying different reagents thereto.

11. The apparatus of claim 10 in which said paths interposed between said supply line and said recation chambers include a common flip-flop valve actuable for supplying reagent alternately to said chambers.

12. Apparatus usabler for petide synthesis or the like comprising:

reaction vessel means including a plurality of reaction chambers;

waste receiving means for receiving leftover liquids from said reaction chambers;

a source of reagents and a supply line for supplying reagents from said source to said plural reaction chambers;

a plurality of recirculation loops;

means connecting said supply line to (1) said plurality of recirculation loops for supplying reagent liquid thereto and (2) said waste receiving means for flushing residual contents of said supply line to waste, said means including individual paths containing valve means and leading to each said recirculation loop, said valve means being actuable for (1) supplying a first reagent from said supply line to a first said recirculation loop and thereafter supplying a second reagent from said supply line to a second said recirculation loop and alternately actuable for (2) supplying the same reagent from the supply line to said first recirculation loop and to said second recirculation loop;

each of said recirculation loops comprising one of said reaction chambers, a column, a reservoir in flow communication with each of said columns, and a pump connected in loop with each of said columns and reservoirs for circulating reagent liquid from said reservoir through said column and back to said reservoir, said valve means being actuable for supplying reagent liquid from said reagent source through said supply line to a selected one of said reservoirs, waste valve means interposed in said plural loops and connected to said waste receiving means and actuable for draining said loops selectively to said waste receiving means, transfer lines connected between said loops and including transfer valve means interposed in said loops and actuable for connecting the columns of at least first and second ones of said loops in series with the pump and reservoir of said first loop for simultaneously circulating a single regent through several of said columns, said transfer valve measn being alternatley shiftable for limiting circulating of regent liquid by a given pump and from a given reservoir to the loop containing said given reservoir and pump.

13. Apparatus usable for peptide symthesis and the like, comprising;

a reaction vessel capable of being loaded with a starting material;

waste outlet means;

a supply line having an upstream end and a downstream end, said supply line being alternatively connectable at its downstream end to said reaction vessel and said waste outlet means;

washing means including at least one cleaning liquid container and a corresponding cleaning liquid supply valve located in the upstream portion of said supply line, a flow line connecting said cleaning liquid supply valve and cleaning liquid container, said cleaning liquid supply valve being actuable for moving cleaning liquid from said cleaning liquid container through said supply line to said waste outlet means for washing said supply line;

blowing means comprising a pressurized gas supply and means actuable for establishing a gas flow connection of said gas supply to said supply line adjacent the upstream end thereof, said cleaning liquid supply valve being switchable in coordination with said connection of said gas supply to said supply line for blowing liquid out of said supply line with said pressurized gas from said gas supply;

a first regent container and a first reagent supply valve located in said supply line downstream of said cleaning liquid supply valve, a flow line connecting said first reagent supply valve and first reagent container, said first reagent supply valve being actuable for adding a first reagent liquid from said first reagent container through said supply line to said reaction vessel, said first reagent supply valve being switchable in corrdination with said connection of said pressurized gas supply to said supply line for blowing residual first reagent liquid out of said supply line and into said reaction vessel and for assisting contact of said first reagent liquid with material in said reaction vessel;

a flow line connecting said supply line and said reaction vessel and waste outlet means and including means actuable after mixing of said first reagent liquid with material in said reaction vessel for emptying leftover liquid from said reaction vessel to said waste outlet means;

a second reagent container and a second reagent supply valve in said supply line downstream of said cleaning liquid supply valve, a flow line connecting said second reagent supply valve and second reagent container, said second reagent supply valve being actuable for moving a second reagent liquid from said second reagent container through said supply line to said reaction vessel;

means for sequentially acatuating said washing means and blowing means between additions of different reagent liquids to said reaction vessel to avoid cross-contamination between said reagent liquids and said supply line.

14. The apparatus of claim 13 including a pump interposed in series with said supply line and reaction vessel and actuable for pumping reagent from said first reagent container through said supply line to said reaction vessel, waste valve means interposed in series in the pump-reaction vessel path downstream of the pump and actuable for venting to said waste outlet means residual liquid droplets blown out of said supply line through said pump by inert gas from said pressurized gas supply.

15. The apparatus of claim 13 in which said reaction vessel has an inlet in its bottom, said means for emptying including a waste valve connected between the downstream end of said supply line and said reaction vessel and said waste outlet means, said waste valve being alternately positionable for forwarding reagent liquid into the inlet of said reaction vessel or flushing said supply line to said waste outlet means to clean and ready same for a new reagent and to drain leftover liquid from said reaction vessel to said waste outlet means.

16. The apparatus of claim 13 including a plurality of chambers, said reaction vessel including at least one of said chambers, valve means actuable for connecting several of said plurality of chambers at least alternately to said supply line, said valve means being actuable to at least alternately supply reagents to said chambers.

* * * * *

UNITED STATES PATENT AND TRADEMARK OFFICE
CERTIFICATE OF CORRECTION

PATENT NO. : 4,746,490

DATED : May 24, 1988

INVENTOR(S) : Hossain H. Saneii

It is certified that error appears in the above-identified patent and that said Letters Patent is hereby corrected as shown below:

Column 26, Line 42; Change "saisd" to ---said---.
Column 26, Line 60; Change "sais" to ---said---.
Column 26, Line 62; Change "posiiton" to ---position---.
Column 27, Line 13; Change "upstram" to ---upstream---.
Column 27, Line 33; Change "tis" to ---its---.
Column 28, Line 43; Change "said valve" to ---said column feed valve---.
Column 28, Line 45; Before "valve" insert ---feed---.
Column 28, Line 45; Change "form" to ---from---.
Column 28, Line 59; Change "resdual" to ---residual---.
Column 29, Line 10; Change "mans" to ---means---.
Column 29, Line 46; Change "therof" to ---thereof---.
Column 29, Line 62; Change "mens" to ---means---.
Column 30, Line 22; Change "usabler" to ---usable---.
Column 30, Line 66; Change "measn" to ---means---.
Column 31, Line 24; Change "theroef" to ---thereof---.
Column 31, Line 29; Change "regent" to ---reagent---.
Column 31, Line 37; Change "corrdination" to ---coordination---.
Column 32, Line 13; Change "acatuating" to ---actuating---.

Signed and Sealed this

Fifteenth Day of November, 1988

*Attest:*

DONALD J. QUIGG

*Attesting Officer*      *Commissioner of Patents and Trademarks*